(12) United States Patent
Inoue et al.

(10) Patent No.: US 7,181,365 B2
(45) Date of Patent: Feb. 20, 2007

(54) DIAGNOSTIC DATA DETECTION AND CONTROL

(75) Inventors: Keisuke Inoue, Sagamihara (JP); Tsuyoshi Ide, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/077,285

(22) Filed: Mar. 10, 2005

(65) Prior Publication Data

US 2005/0209820 A1 Sep. 22, 2005

(30) Foreign Application Priority Data

Mar. 10, 2004 (JP) ............................ 2004-068205

(51) Int. Cl.
*G06F 11/30* (2006.01)
(52) U.S. Cl. .................................................. 702/183
(58) Field of Classification Search ................ 702/182, 702/183, 187, 189, 196
See application file for complete search history.

(56) References Cited

U.S. PATENT DOCUMENTS 6,587,812 B1 *  7/2003  Takayama ................... 702/182
6,795,793 B2 *  9/2004  Shayegan et al. ........... 702/179

OTHER PUBLICATIONS

Eamonn Keogh et al., "Clustering of Time Series Subsequences is Meaningless: Implications for Previous and Future Research," IEEE International Conference on Data Mining (ICDM 2003), 12 pages.

K. Yamaishi et al., "A Unifying Framework for Detecting Outliers and Change Points from Non-Stationary Time Series Data," Proc. Of the Eighth ACM SIGKDD International Conference on Knowledge Discovery and Data Mining, ACM Press (KDD2002), 2002, 7 pages.
M. Ghil et al., "Advanced Spectral Methods for Climatic Time Series," Reviews of Geophysics, 40 (2002), 130 pages.
Daxin Jiang et al., "DHC: A Density-based Hierarchical Clustering Method for Time Series Gene Expression Data," Third IEEE Symposium on BioInformatics and BioEngineering (BIBE'03), 9 pages.
Antonello Panuccio et al., "A Hidden Markov Model-based approach to sequential data clustering," Structural, Syntactic, and Statistical Pattern Recognition, Proceedings of Joint IAPR International Workshops SSPR 2002 and SPR 2002, Windsor, Ontario, Canada, Aug. 6-9, 2002, 2 pages.

(Continued)

*Primary Examiner*—Bryan Bui
(74) *Attorney, Agent, or Firm*—Louis P. Herzberg

(57) ABSTRACT

Provides a diagnostic apparatus for diagnosing a measured object based on time-series data of a plurality of parameters measured from the measured object. An example of an apparatus includes a change-point score calculating portion for calculating a time-series change-point score with which each of the plurality of parameters changes according to passage of time based on the time-series data on the parameter, a change-point correlation calculating portion for calculating a change-point correlation indicating strength by which each of the plurality of parameters is associated with each of other parameters based on the change-point scores of the parameter and the other parameter, and a parameter outputting portion for outputting a set of parameters of which calculated degrees of associations are higher than a predetermined reference change-point correlation as a set of mutually strongly associated parameters.

18 Claims, 16 Drawing Sheets

OTHER PUBLICATIONS

Takehisa Yairi et al., "Method of Malfunction Detection from Artificial Satellite Telemetry Data based on Time Series Correlation Rule Mining," The 15th Annual Conference on Japanese Society for Artificial Intelligence, 2001, 3D1-01, 4 pages.

* cited by examiner (A) FREQUENCY OF THE NEWS OF A REMARK OF THE PRESIDENT OF A COUNTRY A (B) FREQUENCY OF THE NEWS OF AN UNEMPLOYMENT RATE OF THE COUNTRY A (C) FREQUENCY OF THE NEWS OF A REMARK OF A FINANCIER OF A COUNTRY B (D) STOCK PRICE INDEX OF THE COUNTRY A (a)

(b)

| ECONOMIC NEWS STRONGLY ASSOCIATED WITH THE STOCK PRICE INDEX OF THE COUNTORY A ||
|---|---|
| CONDITION | CHANGE-POINT CORRELATION |
| INCLUDING THE REMARK OF THE FINANCIER OF THE COUNTORY B | 0.51 |
| INCLUDING THE REMARK OF THE PRESIDENT OF THE COUNTORY A | 0.42 |
| . | . |
| . | . |
| . | . |
| . | . |

DIAGNOSTIC DATA DETECTION AND CONTROL

FIELD OF THE INVENTION

The present invention relates to a diagnostic apparatus, a detector, a control method, a detection method, a program and a recording medium. In particular, it relates to diagnostic data detection and control for obtaining effective information from a large amount of measurement data.

BACKGROUND ART

In recent years, a computer is used not only in a computer system but also in a mechanical system. For instance, as for the mechanical system such as an automobile, an airplane or production facilities, the computer measures internal states of each component of the mechanical system with various sensors, and automatically controls the components according to measurement results. By way of example, an automobile in recent years has 50 to 100 sensors therein.

As the number of the sensors increases and control becomes complicated. It becomes difficult, in the case of occurrence of trouble to the automobile, to figure out a cause thereof. In particular, in the case when trouble occurs due to a problem of software for the control, or in the case when reoccurence ratio of the trouble is low, there is a limit to repairs made by an engineer at a repair plant depending on the engineer's experience or intuition. For this reason, one measure to figure out the cause of the trouble is by analyzing time-series changes of parameters measured by the sensors. However, it is not easy to properly analyze an enormous amount of data.

The following documents are considered:

[Non-Patent Document 1]
Daxin Jiang, Jian Pei, and Aidong Zhang "DHC: A Density-based Hierarchical Clustering Method for Time Series Gene Expression Data," Third IEEE Symposium on BioInformatics and BioEngineering (BIBE' 03)

[Non-Patent Document 2]
Davood Rafiel, "Fourier-transform based techniques in efficient retrieval of similar time sequences," Univ. Toronto dissertation, 1999

[Non-Patent Document 3]
Antonello Panuccio, Manuele Bicego, and Vittorio Murino, "A Hidden Markov Model-based approach to sequential data clustering," Structural, Syntactic, and Statistical Pattern Recognition, Proceedings of Joint IAPR International Workshops SSPR 2002 and SPR 2002, Windsor, Ontario, Canada, Aug. 6–9, 2002

[Non-Patent Document 4]
Takehisa Yairi, Yoshikiyo Kato, Koichi Hori, and Shinichi Nakasuga, "Method of Malfunction Detection from Artificial Satellite Telemetry Data based on Time Series Correlation Rule Mining," The 15th Annual Conference on Japanese Society for Artificial Intelligence, 2001, 3D1-01

[Non-Patent Document 5]
Eamonn Keogh, Jessica Lin, and Wagner Truppel, "Clustering of Time Series Subsequences is Meaningless: Implications for Previous and Future Research," IEEE International Conference on Data Mining (ICDM 2003)

[Non-Patent Document 6]
K. Yamaishi and J. Takeuchi, "A Unifying Framework for Detecting Outliers and Change Points from Non-Stationary Time Series Data," Proc. Of the Eighth ACM SIGKDD International Conference on Knowledge Discovery and Data Mining, ACM Press (KDD2002), 2002

[Non-Patent Document 7]
M. Ghil, M. R. Allen, M. D. Dettinger, K. Ide, D. Kondrashov, M. E. Mann, A. W. Robertson, A Saunders, Y. Tian, F. Varadi, and P. Yiou, "Advanced Spectral Methods for Climatic Time Series," Reviews of Geophysics, 40 (2002), pp. 1–41

[Non-Patent Document 8]
N. Golyandina, V. Nekrutkin and A. Zhigljavsky, Analysis of Time Series Structure: SSA and Related Techniques, Chapman and Hall/CRC, 2001

There has been proposed, for the sake of such an analysis, of a technique for classifying a plurality of measured parameters by groups of the parameters of which behavior is similar to one another (refer to Non-Patent Documents 1 to 4). Non-Patent Documents 5 to 7 will be described later.

In recent years, the computer is not only used in the mechanical system but is also used for calculation and analyses of indices in economy and industries. For instance, a trader dealing in securities such as stocks analyzes economic indices and so on by using the computer to determine timing in buying and selling the securities.

The techniques in Non-Patent Documents 1 to 4 classify parameters based on a tendency of a change in the case where each parameter constantly changes according to passage of time. For instance, time-series data is Fourier-transformed so as to compare cyclical changes of the parameters and classify the parameters showing the same tendency in the same group.

In the case where a first parameter changes suddenly rather than cyclically for instance, these techniques cannot properly detect another parameter influencing the first parameter or still another parameter influenced by the first parameter. For instance, Non-Patent Document 5 points out that the techniques in Non-Patent Documents 1 to 4 are substantially effective only in the case where a parameter constantly changes.

Furthermore, the techniques in Non-Patent Documents 1 to 4 can properly classify the parameters only in the case where the parameters are of mutually similar types. To be more specific, these techniques assume uniformity of parameter values. For this reason, in the case where one parameter is a continuous value and another parameter is a discrete value, it is not possible to determine whether or not the changes are similar as to these parameters. It is not possible to determine whether or not the parameters in mutually different units or ranges are similar. The technique in Non-Patent Document 6 assumes the uniformity of the space direction although it does not assume constancy in a time base direction.

Tsame problem occurs in forecasting price fluctuation of securities, wherein it is difficult to properly determine association between a price of a stock and another index having a measurment unit different from that of the price.

SUMMARY OF THE INVENTION

Thus, an aspect of the present invention is to provide a diagnostic apparatus, a detector, a control method, a detection method, a program and a recording medium capable of solving the problems. This aspect is attained by a combination of characteristics described in independent items in the Claims. Dependent items prescribe more advantageous concrete examples of the present invention.

To solve the problems, a first form of the present invention provides a diagnostic apparatus for diagnosing a measured object based on time-series data on a plurality of parameters measured from a measured object; a control method of the diagnostic apparatus; a program for controlling the diagnostic apparatus; and a recording medium having the program recorded thereon. An example of a diagnostic apparatus comprising: a change-point score calculating portion for calculating a time-series change-point score with which each of the plurality of parameters changes according to passage of time based on the time-series data on the parameter; a change-point correlation calculating portion for calculating a change-point correlation indicating strength by which each of the plurality of parameters is associated with each of other parameters based on the change-point scores of the parameter and the other parameter; and a parameter outputting portion for outputting a set of parameters of which calculated degrees of association are higher than a predetermined reference change-point correlation as a set of mutually strongly associated parameters.

A second form of the present invention provides a detector for detecting economic news highly associated with price fluctuation of securities, a detection method using the detector, a program for controlling the detector and a recording medium having the program recorded thereon. An example of a detector comprising: a change-point score calculating portion for calculating the change-point score with which prices of the securities in the past have changed according to the passage of time based on the time-series data indicating the price fluctuation of the securities, and calculating the time-series change-point score of a frequency with which the economic news satisfying each of a plurality of conditions has been reported based on the time-series data indicating the frequency with which the economic news satisfying the condition has been reported; the change-point correlation calculating portion for calculating the change-point correlation indicating the strength by which the change-point score of the prices of the securities is associated with the change-point score of the frequency with which the economic news satisfying each of the plurality of conditions has been reported; and a parameter outputting portion for, of the plurality of conditions, outputting a set of the conditions of the economic news of which degrees of association with the change-point score of the prices of the securities are higher than the predetermined reference change-point correlation.

According to the present invention, it is possible to determine whether or not the changes of different types of parameters according to the passage of time are similar.

DETAIL DESCRIPTION OF THE INVENTION

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF SYMBOLS

Figures 1, 4:
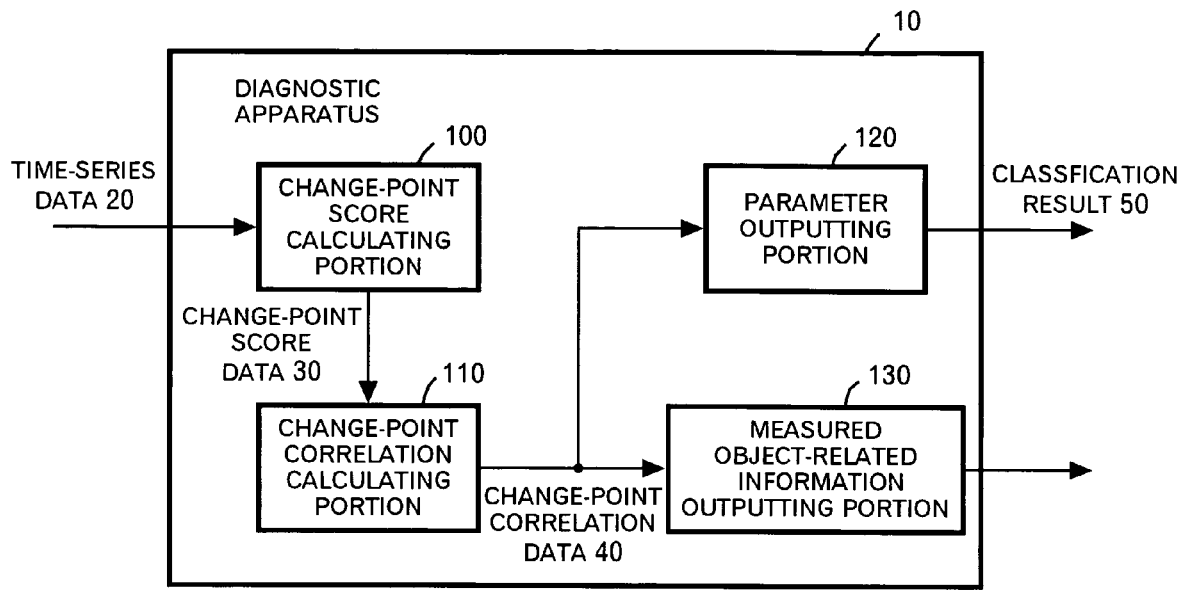
FIG. 1 is a block diagram of a diagnostic apparatus 10.
FIG. 4 shows an example of change-point correlation data 40.

10 . . . Diagnostic apparatus
20 . . . Time-series data
30 . . . change-point score data
40 . . . change-point correlation data
50 . . . Classification result
60 . . . Detector
100 . . . change-point score calculating portion
110 . . . change-point correlation calculating portion
120 . . . Parameter outputting portion
130 . . . Measured object-related information outputting portion

DETAILED DESCRIPTION OF THE INVENTION

The present invention provides a diagnostic apparatus, a detector, a control method, a detection method, a program and a recording medium capable of solving the problems of diagnosing a measured object when there is an abundance of sensor data. The present invention provides a diagnostic apparatus for diagnosing the measured object based on time-series data of a plurality of parameters measured from the measured object, and a control method of the diagnostic apparatus; a program for controlling the diagnostic apparatus and a recording medium having the program recorded thereon. An example of a diagnostic apparatus comprising: a change-point score calculating portion for calculating a time-series change-point score with which each of the plurality of parameters changes according to passage of time based on the time-series data on the parameter; a change-point correlation calculating portion for calculating a change-point correlation indicating strength by which each of the plurality of parameters is associated with each of other parameters based on the change-point scores of the parameter and the other parameter; and a parameter outputting portion for outputting a set of parameters of which calculated degrees of association are higher than a predetermined reference change-point correlation as a set of mutually strongly associated parameters.

The present invention also provides a detector for detecting economic news highly associated with price fluctuation of securities; a detection method using the detector; a program for controlling the detector and a recording medium having the program recorded thereon. An example of a detector comprising: a change-point score calculating portion for calculating the change-point score with which prices of the securities in the past have changed according to the passage of time based on the time-series data indicating the price fluctuation of the securities, and calculating the time-series change-point score of a frequency with which the economic news satisfying each of a plurality of conditions has been reported based on the time-series data indicating the frequency with which the economic news satisfying the condition has been reported; a change-point correlation calculating portion for calculating the change-point correlation indicating the strength by which the change-point score of the prices of the securities is associated with the change-point score of the frequency with which the economic news satisfying each of the plurality of conditions has been reported; and a parameter outputting portion for the plurality of conditions, outputting a set of the conditions of the economic news of which degrees of association with the change-point score of the prices of the securities are higher than the predetermined reference change-point correlation. In this way, it is possible to determine whether or not the changes of different types of parameters according to the passage of time are similar.

Hereafter, the present invention will be described through an embodiment thereof. However, the following embodiment does not limit the invention, and not all combinations of the characteristics described in the embodiment are necessarily essential for solving the problems solved by the invention.

FIG. 1 is a block diagram of a diagnostic apparatus 10. The diagnostic apparatus 10 comprises a change-point score calculating portion 100, a change-point correlation calculating portion 110, a parameter outputting portion 120 and a measured object-related information outputting portion 130. A purpose of the diagnostic apparatus 10 is to diagnose a measured object based on time-series data on a plurality of parameters measured from the measured object.

The change-point score calculating portion 100 performs the following process to each of a plurality of measured objects having mutually corresponding parameters. First, the change-point score calculating portion 100 inputs time-series data 20 on the plurality of parameters measured by a plurality of sensors provided to each portion of the measured object. And the change-point score calculating portion 100 calculates a time-series change-point score with which each of the plurality of parameters changes according to passage of time based on the time-series data on the parameter. The change-point score calculating portion 100 sends the change-point score calculated about each parameter as change-point score data 30 to the change-point correlation calculating portion 110.

On receiving the change-point score data 30, the change-point correlation calculating portion 110 calculates a change-point correlation indicating strength by which each of the plurality of parameters is associated with each of other parameters based on the change-point scores of the parameter and the other parameter. And the change-point correlation calculating portion 110 sends the change-point correlation calculated about each set of parameters as change-point correlation data 40 to the parameter outputting portion 120 and the measured object-related information outputting portion 130.

Based on the received change-point correlation data 40, the parameter outputting portion 120 determines a set of parameters of which calculated degrees of association are higher than a predetermined reference change-point correlation as a set of mutually strongly associated parameters. And the parameter outputting portion 120 classifies the plurality of parameters of the measured object into groups including mutually strongly associated parameters, and outputs a classification result 50.

The measured object-related information outputting portion 130 receives the change-point correlation data 40 on each of the plurality of measured objects. And the measured object-related information outputting portion 130 generates and outputs information indicating association between a first measured object and a second measured object based on each change-point correlation of the first measured object and the change-point correlation of the second measured object corresponding thereto.

Figure 2:
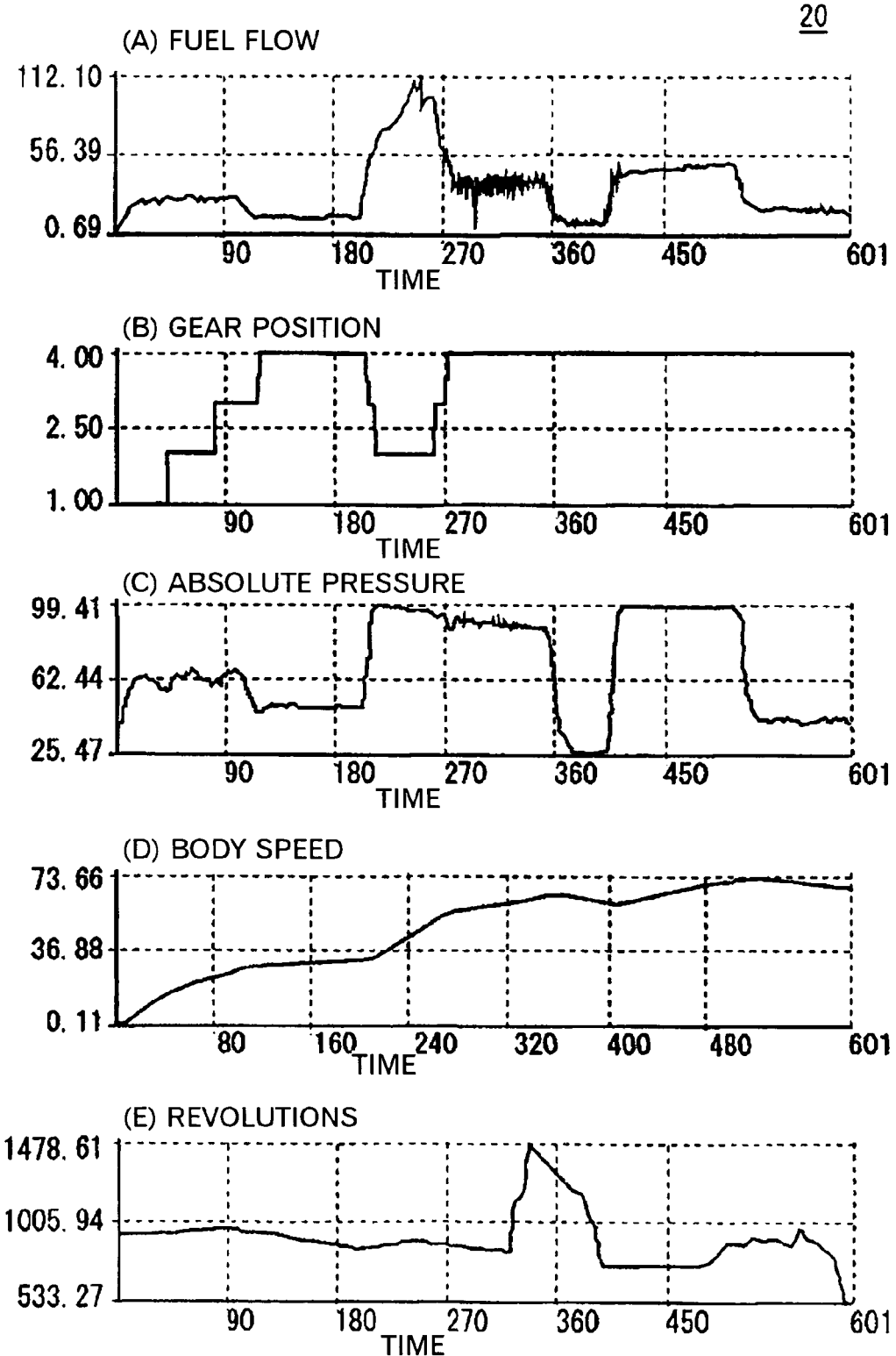
FIG. 2 shows an example of time-series data 20.

A description will be given by using FIGS. 2 to 9 as to the details of the process of the diagnostic apparatus 10 in an example in which the measured object is an automobile. FIG. 2 shows an example of the time-series data 20. In each of (A) to (E), a horizontal axis shows the passage of time, and a vertical axis shows a value of each parameter. The change-point score calculating portion 100 inputs as the time-series data 20 the time-series data on the plurality of parameters measured from the automobile as the measured object in the same predetermined measurement period. To be more specific, the change-point score calculating portion 100 inputs the time-series data on a fuel flow measured from the automobile, the time-series data on a gear position measured from the automobile, the time-series data on an absolute pressure (compression) of an engine measured from the automobile, the time-series data on a body speed measured from the automobile and the time-series data on engine revolutions measured from the automobile.

And the plurality of parameters have mutually different units and ranges. For instance, the unit of the fuel flow is unknown, the unit of the gear position is not determined, and the unit of the absolute pressure is kPa (kilopascal) and so on. The unit of the body speed is km/h (kilometers per hour), and the unit of the revolutions is rpm (revolutions per minute). While the range of a liquid flow rate is unknown, the range of the gear position is 0 to 5 and the range of the absolute pressure is 0 to 140. The range of the body speed is 0 to 220, and the range of the revolutions is 0 to 4500.

Furthermore, while the fuel flow, absolute pressure, body speed and revolutions are continuously changing parameters, the gear position is a discretely changing parameter. Thus, the change-point score calculating portion 100 may input each of the continuously changing parameters and the discretely changing parameters as the time-series data 20.

Figure 3:
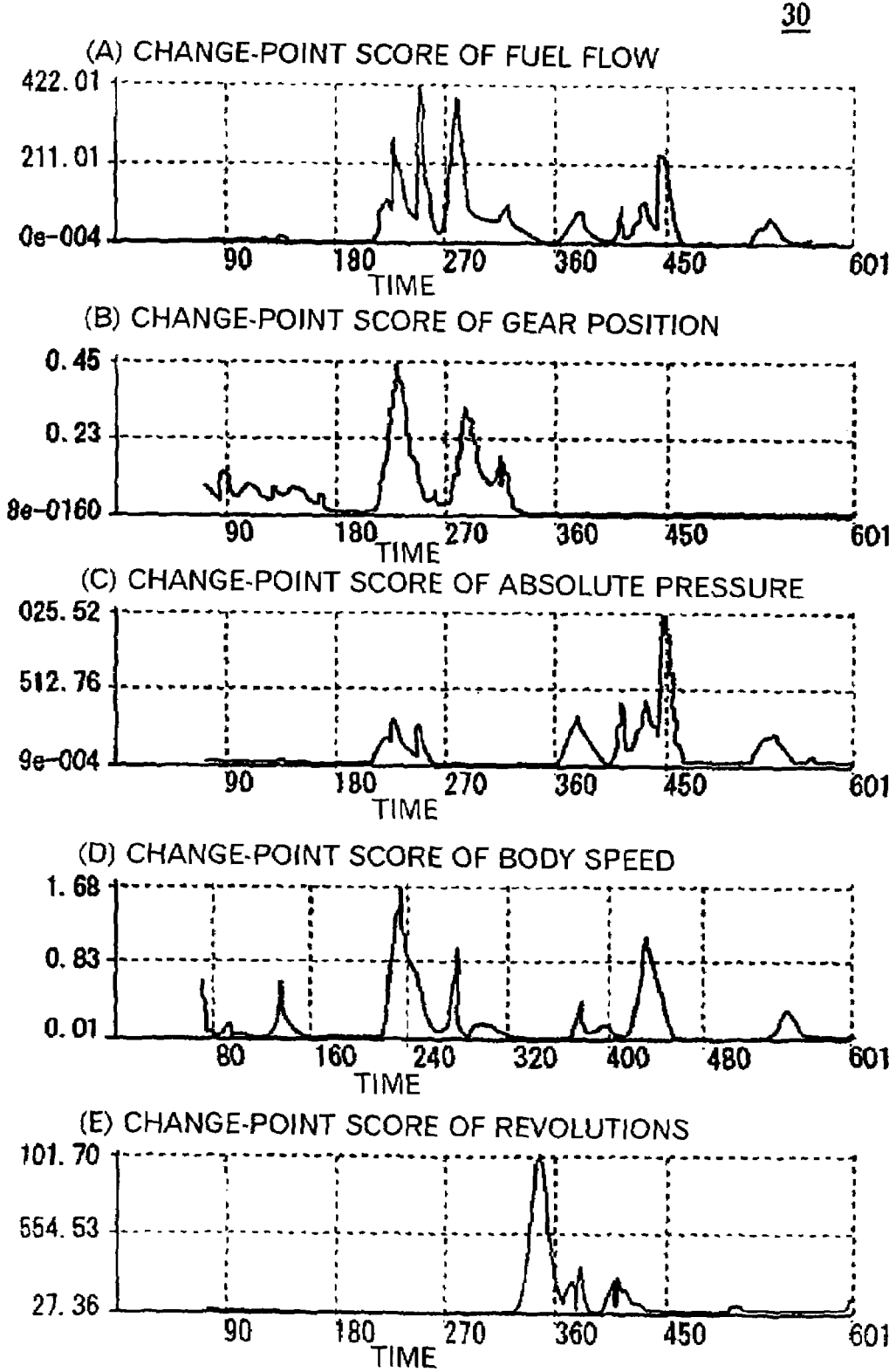
FIG. 3 shows an example of change-point score data 30.

FIG. 3 shows an example of the change-point score data 30. In each of (A) to (E), the horizontal axis shows the passage of time, and the vertical axis shows the change-point score of each parameter. Each of (A) to (E) in FIG. 3 is corresponding to each of (A) to (E) in FIG. 2.

On inputting the time-series data 20 shown in FIG. 2, the change-point score calculating portion 100 calculates the time-series change-point score with which each of the plurality of parameters changes according to the passage of time based on the time-series data on the parameter. To be more precise, the change-point score calculating portion 100 calculates the change-point score of the fuel flow of the automobile as the measured object based on the time-series data on the fuel flow thereof and calculates the change-point score of the gear position of the automobile based on the time-series data on the gear position thereof.

The change-point score calculating portion 100 calculates the change-point score of the absolute pressure of the engine of the automobile based on the time-series data on the absolute pressure of the engine thereof, and calculates the change-point score of the revolutions of the engine of the automobile based on the time-series data on the revolutions of the engine thereof. By way of example, the change-point score of the fuel flow is extremely low during the time from 0 to 180, and is relatively high during the time from 180 to 360.

Thus, as to each of the plurality of parameters in mutually different units and so on, the change-point score calculating portion 100 calculates the time-series change-point score with which the parameter changes according to the passage of time. FIG. 4 shows an example of the change-point correlation data 40. To be more specific, FIG. 4 shows as a matrix the strength by which each of the pair of parameters of the measured object is associated with each of other plurality of parameters. In FIG. 4, the change-point correlation takes a value from 0 to 1, which indicates that the larger the value becomes, the stronger the change-point correlation is. And each of A to E shown in FIG. 4 is corresponding to each of (A) to (E) shown in FIGS. 2 and 3.

The change-point correlation calculating portion 110 calculates the change-point correlation indicating the strength by which each of the plurality of parameters is associated with each of the other parameters based on the change-point scores of the parameter and the other parameter. For instance, the change-point correlation calculating portion 110 calculates at 0.38 the change-point correlation indicating the strength by which the fuel flow of the automobile as the measured object is associated with the gear position thereof. In FIG. 4, the change-point correlation lower than 0.3 as the reference change-point correlation is parenthesized.

Figure 5:
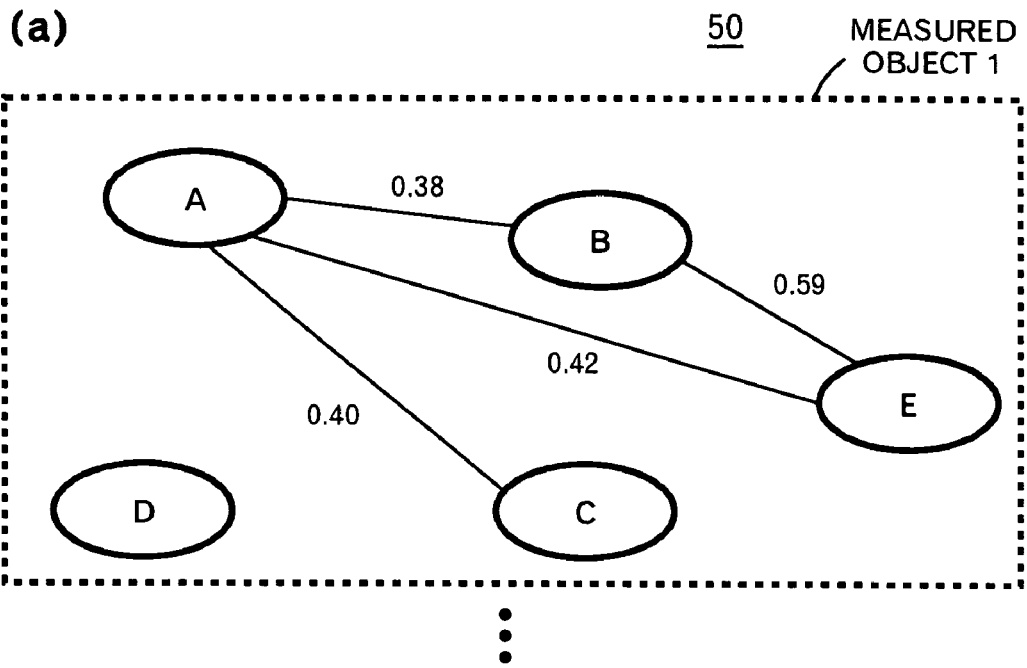
FIG. 5 shows an example of a classification result 50.
Figure 5:
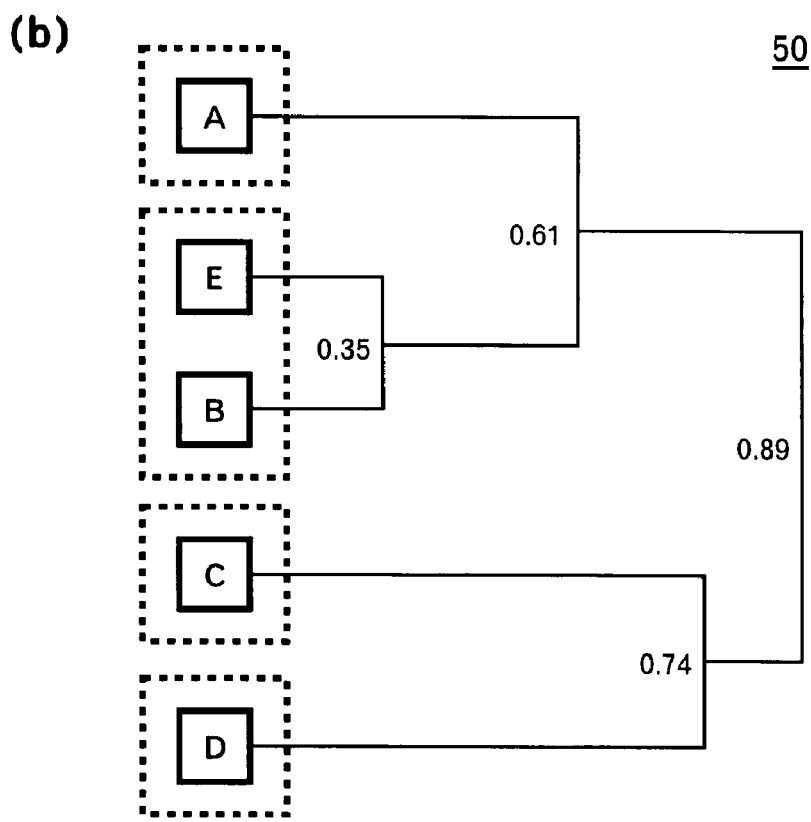

FIG. 5 shows an example of the classification result 50.

(a) shows a set of parameters of which mutual degrees of association are higher than the reference change-point correlation. The parameter outputting portion 120 outputs the set of parameters of which degrees of association are higher than the reference change-point correlation (0.3 for instance) as mutually strongly associated parameters. For instance, as shown in FIG. 5, the parameter outputting portion 120 may also output a graph showing each parameter as a vertex and the change-point correlation is higher than the reference change-point correlation as an edge as information indicating the mutually strongly associated parameters.

(b) shows another example of the information indicating the mutually strongly associated parameters outputted by the parameter outputting portion 120. In this example, the parameter outputting portion 120 may further calculate distances of each of the pair of parameters and each of the other parameters. To be more precise, the parameter outputting portion 120 calculates the distance between one parameter and the other parameter at a smaller value in the case where the change-point correlation between the parameter and the other parameter is higher compared to the case where it is lower.

Here, the distance means an index value satisfying the same condition as that of the distance on an Euclidean plane. To be more precise, the distance satisfys the condition that a total distance from a parameter A by way of another parameter B to a further parameter C is constantly the distance from the parameter A to the parameter C or longer.

In this example, the parameter outputting portion 120 classifies the plurality of parameters into the groups including the mutually strongly associated parameters based on the calculated distance. For instance, the parameter outputting portion 120 calculates the distance between the gear position (B) of the automobile and the revolutions of the engine (E) thereof at 0.35. The parameter outputting portion 120 also calculates the distance between the fuel flow (A) and the nearer one of the gear position (B) and the revolutions (E) at 0.61.

And the parameter outputting portion 120 classifies the parameters of which mutual distance is less than 0.6 into the same group. Consequently, the gear position (B) and the revolutions (E) are classified into the same group, and each of the other parameters is classified into one group.

Thus, the parameter outputting portion 120 can classify both the discretely changing parameters and continuously changing parameters such as the gear position and the revolutions into the same group. As shown in FIG. 5, the parameter outputting portion 120 may also calculate the distance of each parameter in addition to the change-point correlation thereof. Thus, the parameter outputting portion 120 can apply various algorithms for classifying a plurality of vertices placed on the plane based on the distance between the vertices so as to efficiently perform a classification process.

Instead, in the case where the parameter to which the trouble has occurred is specified by a user or in the case where a value of the predetermined parameter is outside the reference range, the parameter outputting portion 120 may output only the set of parameters of which degrees of association with that parameter are higher than the reference change-point correlation as the information indicating the cause of the trouble.

Figure 6:
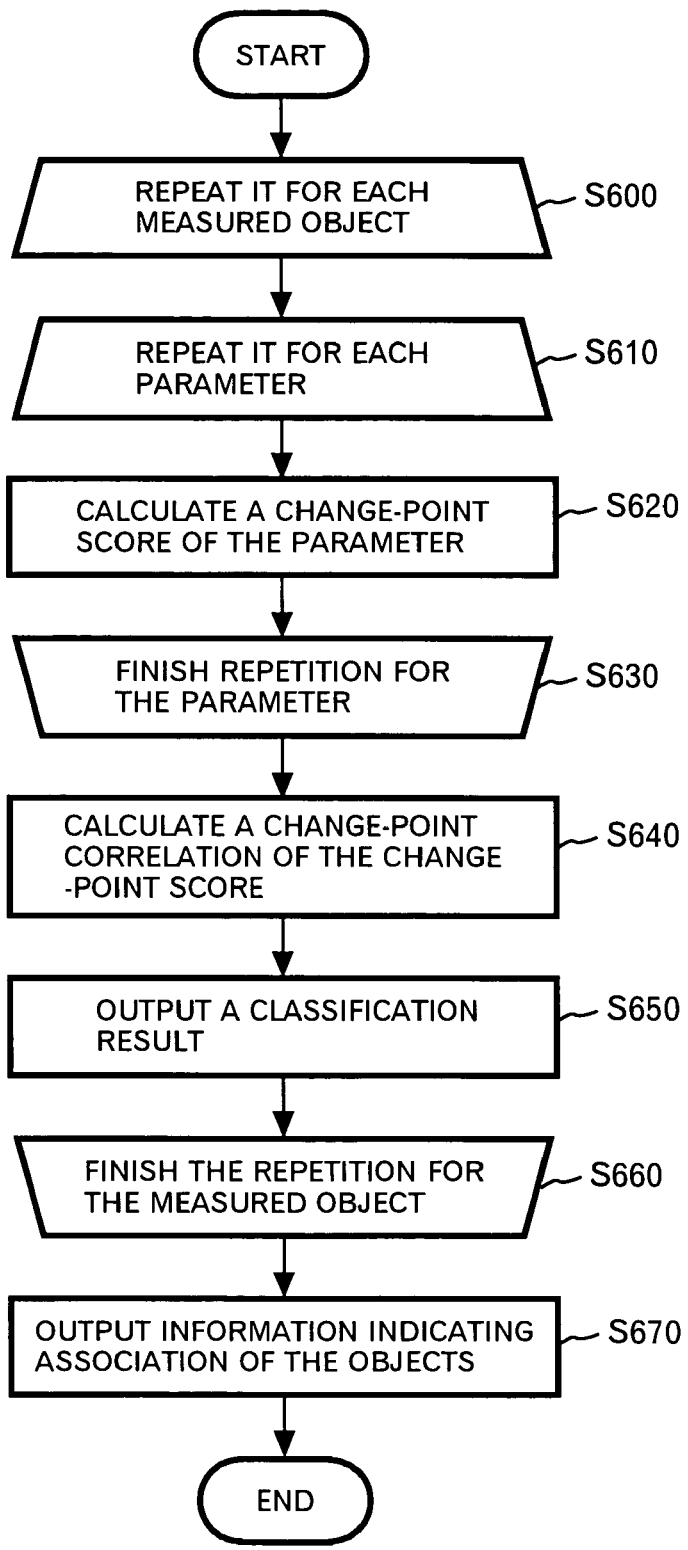
FIG. 6 shows an example of an operation flow of a process of diagnosing an automobile of the diagnostic apparatus 10.

FIG. 6 shows an example of an operation flow of the process of diagnosing the automobile of the diagnostic apparatus 10. The diagnostic apparatus 10 repeats the following process for each of the automobiles as the measured objects (S600). First, as to each of the parameters of the measured objects, the change-point score calculating portion 100 calculates the time-series change-point score with which the parameter changes according to the passage of time (S610 to S630).

Figure 7:
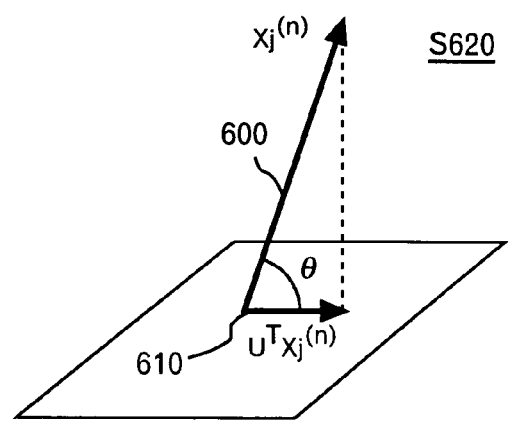
FIG. 7 is a diagram for geometrically describing the process in S620.

For instance, in the case where, as to the change-point score at each time during a predetermined measurement time, a transition pattern of the time-series data at the time is different from that measured in the predetermined range of time from the time in the past, the change-point score calculating portion 100 calculates a higher value in comparison to the case where it is the same as the transition pattern. A detailed description will be given, as an example of calculating the change-point score, as to a process example using a singular-spectrum analysis (SSA, refer to Non-Patent Documents 7 and 8) method. FIG. 7 will be used for the description.

The change-point score calculating portion 100 takes a continuous partial series of length N out of $x_1, x_2, \ldots, x_T$ which is the time-series data. And it takes a partial series of length M out of the portion of length N taken out. Furthermore, the change-point score calculating portion 100 sequentially changes positions for taking out the partial series of length M in a direction of the passage of time and thereby sequentially takes out a plurality of partial series of length M so as to generate the matrix in which each of the series taken out is a column vector arranged sequentially from left to right (Formula 1). The matrix is called a trajectory matrix at a time n.

[Formula 1]

$$X^{(n)} = (x_{n+i+j-1})_{i,j=1}^{M,K} = \begin{pmatrix} x_{n+1} & x_{n+2} & \cdots & x_{n+K} \\ x_{n+2} & x_{n+3} & \cdots & x_{n+K+1} \\ \vdots & \vdots & \ddots & \vdots \\ x_{n+M} & x_{n+M+1} & \cdots & x_{n+N} \end{pmatrix} \quad (1)$$

Here, K=N−M+1 obviously holds. And M is N/2. Subsequently, the change-point score calculating portion 100 performs singular value decomposition of the matrix, and thereby detects left singular vectors of a predetermined number of pieces (λ pieces for instance) from a maximum singular value side. The matrix in which the detected left singular vectors are arranged as column vectors arranged sequentially from left to right is U. The detected left singular vectors show the transition pattern of the time-series data frequently measured in the predetermined period of time from the time in the past.

Subsequently, the change-point score calculating portion 100 detects the time-series data of length M on a future side from the time-series data detected as Formula 1. Formula 2 shows the detected time-series data as the column vector.

[Formula 2]

$$X_j^{(n)} = (x_{n+j}, \ldots, x_{n+M+j-1})^T \quad (2)$$

However, j is an integer larger than n+K. By way of example, it is j=n+1. In this case, Formula 3 is a projection of the column vector in Formula 2 on the space spanned by the λ pieces of singular vectors.

[Formula 3]

$$U^T X_j^{(n)} \quad (3)$$

Noting that the singular vectors belonging to the maximum singular value point to a most representative direction of the column vectors in the trajectory matrix, it is interpreted that, if the result of Formula 3 which is the projection is similar to the result of Formula 2 which is an object of the projection, the data is similar at the point of measuring the time-series data of Formula 1 and at the point of measuring the time-series data of Formula 2. If Formula 2 is not similar to the result of Formula 3 before and after the projection, it is interpreted that the parameter has changed according to the passage of time.

Therefore, as the change-point score of the time-series data at a certain time, the change-point score calculating portion 100 calculates a difference in length between the vector indicating the set of values of the parameter in the neighborhood of the time and the vector having that vector projected thereon by the matrix of the singular vectors. For instance, the change-point score calculating portion 100 calculates the change-point score with Formula 4.

[Formula 4]

$$\frac{1}{M}[(X_j^{(n)})^T X_j^{(n)} - (X_j^{(n)})^T U U^T X_j^{(n)}] \quad (4)$$

FIG. 7 is a diagram for geometrically describing the process in S620. To be more precise, FIG. 7 shows the process of obtaining a vector 610 by projecting a vector 600 indicating the time-series data in the neighborhood of each time on a surface spanned by the singular vectors. As is apparent from FIG. 7, the vector 600 is longer than the vector 610 so that the change-point score calculating portion 100 can calculate a positive value as the change-point score. Thus, it is possible to facilitate calculation of the change-point correlation described later. Instead, the change-point score calculating portion 100 can also calculate the angle of the vector 600 against the vector 610 as the change-point correlation.

As a further example, the change-point score calculating portion 100 can also calculate the change-point scores by using the process at each of a plurality of time points in the time-series data so as to calculate an average of the calculated change-point scores. For instance, the change-point score calculating portion 100 calculates the average of the change-point scores from a time n+p+1 to a time n+q with Formula 5.

[Formula 5]

$$\frac{1}{M(q-p)} \sum_{j=n+p+1}^{n+q} [(X_j^{(n)})^T X_j^{(n)} - (X_j^{(n)})^T U U^T X_j^{(n)}] \quad (5)$$

Subsequently, an application example of calculating the change-point score by using the singular-spectrum analysis method is shown below. This example is set up with N=50, M=25 and l=2. And the change-point score calculating portion 100 calculates the average of the change-point scores from a time n+28 to a time n+74 as the change-point score at each time n of the time-series data (to be more specific, Formula 5 is set up with p=27, q=50). As for a procedure, the change-point score calculating portion 100 first performs singular value decomposition to the matrix of Formula 6.

[Formula 6]

$$\begin{pmatrix} x_{n+1} & x_{n+2} & \cdots & x_{n+26} \\ x_{n+2} & x_{n+3} & \cdots & x_{n+27} \\ \vdots & \vdots & \ddots & \vdots \\ x_{n+25} & x_{n+26} & \cdots & x_{n+50} \end{pmatrix} \quad (6)$$

And the change-point score calculating portion 100 calculates the projection on the space spanned by the singular vectors for each column vector in Formula 7 so as to calculate an average of the differences in length between the vectors before and after the projection as the change-point score (Formula 8).

[Formula 7]

$$\begin{pmatrix} x_{n+28} & x_{n+29} & \cdots & x_{n+50} \\ x_{n+29} & x_{n+30} & \cdots & x_{n+51} \\ \vdots & \vdots & \ddots & \vdots \\ x_{n+52} & x_{n+53} & \cdots & x_{n+74} \end{pmatrix} \qquad (7)$$

[Formula 8]

$$\frac{1}{25 \cdot 23} \sum_{j=n+28}^{n+50} \left[ (X_j^{(n)})^T X_j^{(n)} - (X_j^{(n)})^T U U^T X_j^{(n)} \right] \qquad (8)$$

As shown above, the change-point score calculating portion 100 calculates the change-point score by the singular-spectrum analysis method by way of example. The singular value decomposition by the singular-spectrum analysis method allows the singular vectors to be obtained for an arbitrary matrix. Thus, the change-point score calculating portion 100 can properly calculate the change-point score not only for the continuously changing parameters but also for the discretely changing parameters with the same algorithm. Furthermore, it is possible to exclude the singular vectors of relatively low singular values (from comparison objects) so as to properly calculate the change-point score as to the time-series data mixed with noise and so nondifferentiable.

Instead, the change-point score calculating portion 100 may calculate the change-point score by differentiating a function indicating the time-series data as a differential coefficient of first or second order, or observe the time-series data at predetermined intervals to calculate as the change-point score an amount by which a value at a time point of observation increases and decreases against the value at a previous time point. To be more specific, the change-point score is not limited to this example but may be any data indicating a variation or a variation ratio by which the parameters change according to the passage of time.

It returns to FIG. 6. Subsequently, the change-point correlation calculating portion 110 calculates the change-point correlation indicating the strength by which each of the plurality of parameters is associated with each of the other parameters based on the change-point scores of the parameter and the other parameter (S640). An example of this calculation process will be described.

First, the change-point correlation calculating portion 110 normalizes the change-point score of each parameter so that an integral of the change-point score of the parameter in the predetermined measurement period becomes a predetermined unit quantity. For instance, the change-point score of one parameter is x (t) and that of the other parameter is y (t) at a time t. However, the change-point score is constantly over 0 during the measurement period. The change-point correlation calculating portion 110 normalizes the change-point scores of the parameters with Formula 9 so that the integral of the change-point scores in the measurement period from a time T1 to a time T2 becomes 1.

[Formula 9]

$$\tilde{x}(t) = \frac{x(t)}{\int_{T1}^{T2} x(t)dt}, \quad \tilde{y}(t) = \frac{y(t)}{\int_{T1}^{T2} y(t)dt} \qquad (9)$$

The change-point correlation calculating portion 110 calculates the change-point correlation by integrating a lower value of the normalized change-point scores at each time during the measurement period (Formula 10).

[Formula 10]

$$\rho(x, y) = \int_{T1}^{T2} \min(\tilde{x}(t), \tilde{y}(t)) dt \qquad (10)$$

The change-point correlation is equivalent to area of an intersecting portion of regions surrounded by both curves in the case where the normalized change-point scores are superimposed on the same time series.

Figure 8:
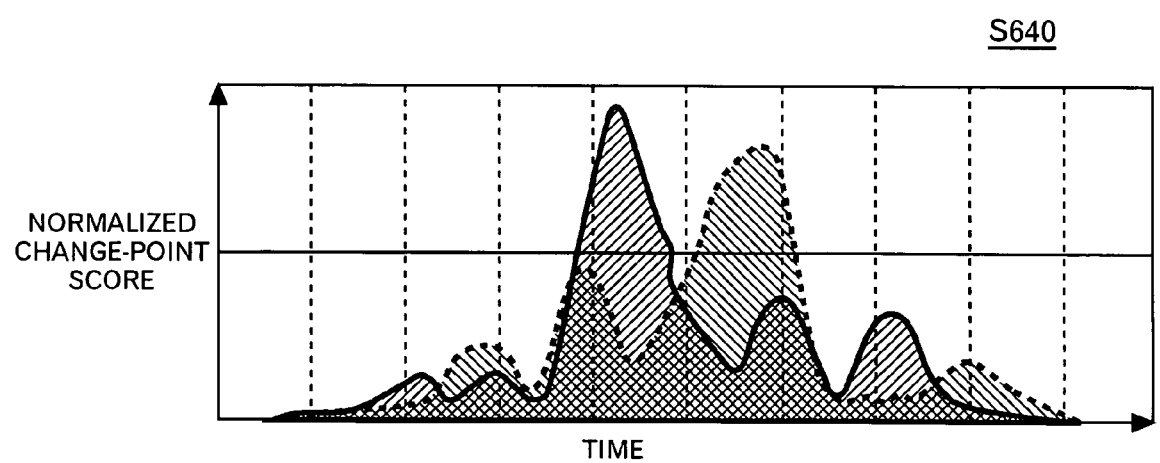
FIG. 8 is a diagram for describing the process in S640.

FIG. 8 is a diagram for describing a concept of the process in S640. A singly shaded portion in FIG. 8 indicates the region in which, as to each variable, the area is equivalent to the integral of the variable. And the area of a doubly shaded portion is equivalent to the change-point correlation.

Consequently, the change-point correlation takes the value of 0 to 1. Thus, even in the case of the plurality of parameters of which units are mutually different, it is possible to obtain the degree of strength of association based on the same measure.

As another example, to obtain the change-point correlation indicating the strength by which each of the plurality of parameters is associated with each of the other parameters, the change-point correlation calculating portion 110 may use as comparison objects the change-point score of the parameter and the change-point score of the other parameter having delayed by a predetermined delay time against the parameter so as to calculate a maximum value of the change-point correlation based on comparisons made by sequentially changing the delay time in the predetermined range. To be more specific, the change-point correlation calculating portion 110 may calculate the change-point correlation with Formula 11. Furthermore, the change-point correlation calculating portion 110 may calculate the delay time in this case with Formula 12.

[Formula 11]

$$\rho(x, y) = \max_{\delta} \left\{ \sum_k \min\{\tilde{x}(t_k + \delta), \tilde{y}(t_k)\} \Delta t_k \right\} \qquad (11)$$

[Formula 12]

$$\delta(x, y) = \underset{\delta}{\arg\max} \left\{ \sum_k \min\{\tilde{x}(t_k + \delta), \tilde{y}(t_k) \Delta t_k\} \right\} \qquad (12)$$

Thus, it is possible to properly calculate the change-point correlation and also obtain a direction of influence exerted on one parameter by the other parameter.

It returns to FIG. 6. Furthermore, the change-point correlation calculating portion 110 may calculate the distance between the parameters based on the calculated change-point correlation. For instance, the change-point correlation calculating portion 110 calculates the distance between the parameters with Formula 13.

[Formula 13]

$$d_p(x,y) = 1 - p(x,y) \tag{13}$$

The value calculated by this Formula satisfies a triangle inequality condition as the distance. To be more specific, the distance from the parameter A by way of the parameter B to the parameter C is the value of the distance from the parameter A to the parameter C or more. A verification that this condition is satisfied will be described by using FIG. 22 later.

Subsequently, the parameter outputting portion 120 classifies and outputs the set of parameters of which calculated degrees of associations are higher than the predetermined reference change-point correlation as the set of mutually strongly associated parameters (S650). For instance, in the case where the parameter to which the trouble has occurred is specified by the user and an instruction to analyze the cause of the occurrence of the trouble to the parameter by a diagnosis is provided, the parameter outputting portion 120 may output only the parameters of which degrees of association may become higher than the reference change-point correlation by delaying it against that parameter. Thus, it is possible to properly output only the parameters which may cause the parameter to become an abnormal value.

The diagnostic apparatus 10 repeats the above process for each of the measured objects (S660). Subsequently, of the plurality of measured objects of which change-point correlation has been calculated, the measured object-related information outputting portion 130 generates and outputs the information indicating the association between the first measured object and the second measured object based on each change-point correlation of the first measured object and the change-point correlation of the second measured object corresponding thereto (S670).

In this case, it is desirable that the measured object-related information outputting portion 130 generate the information indicating the association between the first measured object and the second measured object based not only on the change-point correlation but also on the delay time calculated in S640. For instance, the measured object-related information outputting portion 130 determines whether or not there is a difference exceeding a predetermined reference value between the delay time in the case of calculating the predetermined change-point correlation of the first measured object and the delay time in the case of calculating the predetermined change-point correlation of the second measured object corresponding to that change-point correlation. In the case where there is the difference, the measured object-related information outputting portion 130 produces an output to the effect that a mutual relationship between the parameters of which change-point correlation is to be calculated is different between the first measured object and the second measured object so as to notify the user of occurrence of some abnormality.

As described above, the diagnostic apparatus 10 can calculate the change-point correlation of each parameter based on the change-point score of the parameter value rather than the value of the parameter itself. Thus, it is possible to properly determine whether the association is strong or weak as to the parameters in mutually different units or ranges.

Figure 9:
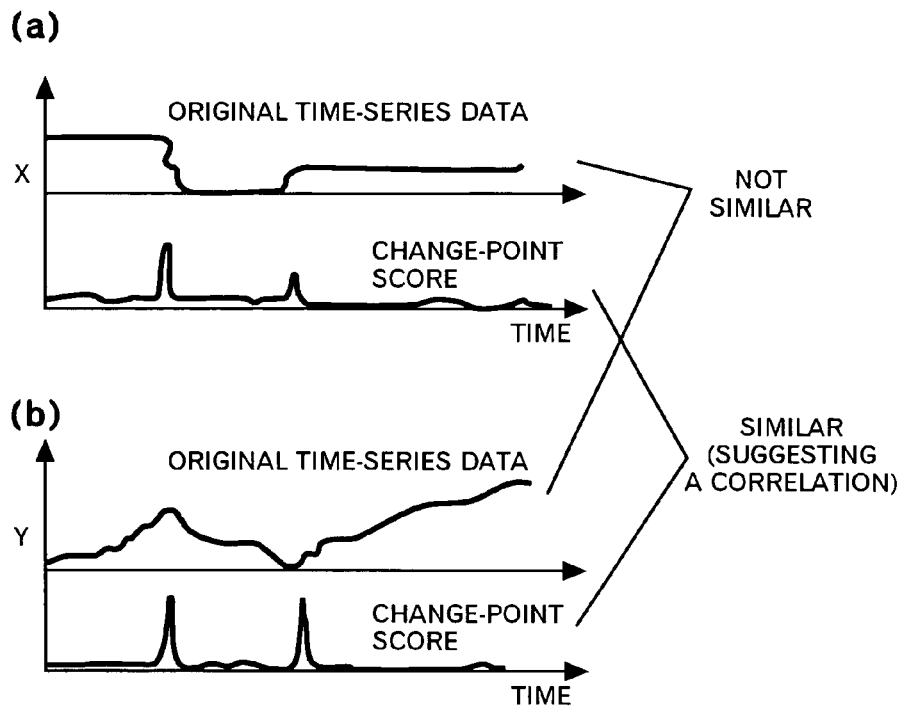
FIG. 9 is a diagram for describing an effect of this embodiment.

FIGS. 9 are diagrams for describing an effect of this embodiment. A description will be given by using FIGS. 9(a) and (b) as to an example which represents the effect more conspicuously. Upper stages of (a) and (b) show the time-series data on the parameters in mutually different units. And lower stages of (a) and (b) show the respective change-point scores. Thus, it is possible, even if there is no similarity at a glance when observing the time-series data on the parameters, to detect the strength of the association by comparing the change-point scores.

Subsequently, a description will be given as to first to fourth application examples in which the diagnostic apparatus 10 diagnoses the measured object.

APPLICATION EXAMPLE 1

To begin with, the first application example will be described by using FIGS. 10 to 13. An object of the first application example is to diagnose the cause of the trouble in the case where the trouble that "the beat occurs to the revolutions" arises to a certain automobile.

In this example, the beat occurs to the revolutions of the engine, and so the parameter strongly associated with the revolutions of the engine should be selected and the portion to be measured of the parameter should be intensively checked and repaired. However, it is not easy to properly select the parameter strongly associated with the revolutions of the engine out of an enormous number of the measured parameters.

The automobile in recent years operates a program for detecting the trouble occurring to each portion thereof, and records identification data on the detected trouble in a memory. By way of example, an SAE code which is the identification data on various kinds of trouble is set up by the SAE (the Society of Automotive Engineers). To be more precise, the identification data indicating that voltage of a manifold pressure sensor is low is P0107, and the identification data indicating that the voltage of a throttle open/close sensor is high is P0123.

However, such a trouble detection program is not sufficient as to the trouble caused not only by a portion of the automobile but by collaborative operation of the portions thereof. For instance, the beat to the revolutions indicated in this application example is often caused by the collaborative operation of the gear position, an inlet flow and so on rather than the abnormality of each parameter value itself. A description will be given below as to the process in which the diagnostic apparatus 10 diagnoses this trouble.

Figure 10:
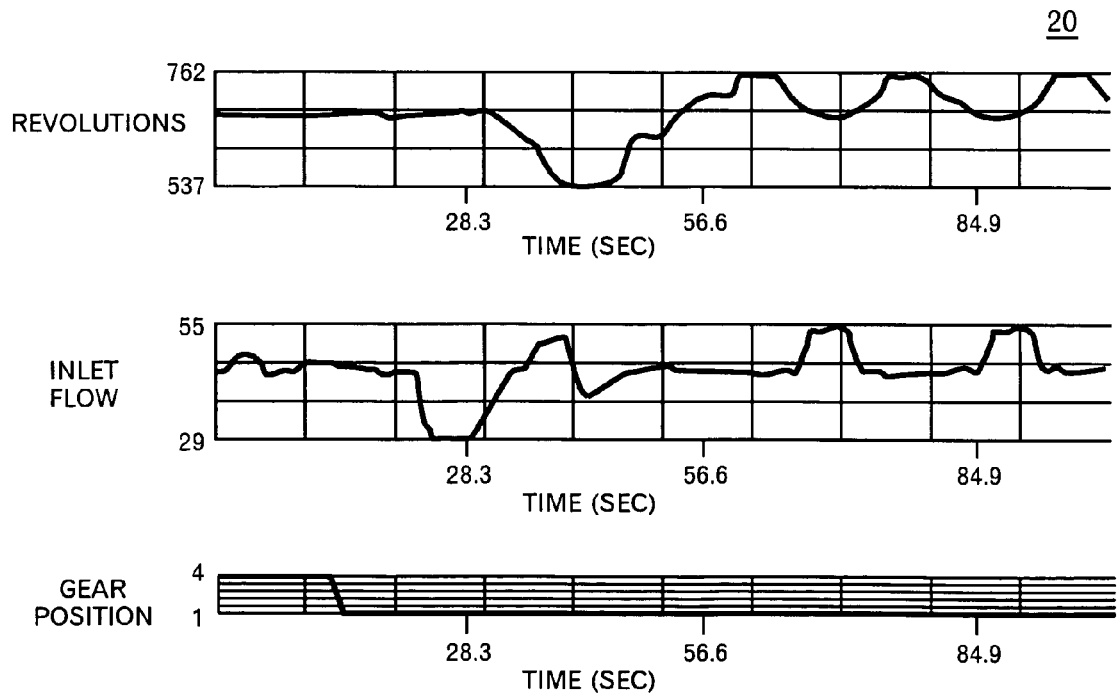
FIG. 10 shows an example of the time-series data 20 measured from a measured object in a first application example.

FIG. 10 shows an example of the time-series data 20 measured from the measured object in the first application example. First, the change-point score calculating portion 100 inputs the time-series data on the revolutions of the engine of the automobile which is the measured object, the time-series data on the inlet flow of the automobile and the time-series data on the gear position of the automobile. The horizontal axis of each graph in FIG. 10 shows the passage of time (seconds), and the vertical axis shows the revolutions, inlet flow or gear position. Another parameter may further be inputted if possible.

The unit of the revolutions is rpm for instance, where the range in this measurement period is from 537 to 762. While the unit of the inlet flow is unknown, the range is 29 to 55. The unit of the gear position is undecided, and the range is 1 to 4.

FIG. 10 shows an example of the case where, when the gear position is P (parking), the inlet flow and the revolutions change in conjunction with it. Under the normal circumstances, both the inlet flow and revolutions immediately change to a lower position when the gear position becomes P. As opposed to this, in the example in FIG. 10, the change in the inlet flow delays against the change in the gear position by a predetermined time or longer. Consequently, the revolutions do not decrease and the beat occurs even though the gear position has become P.

Figure 11:
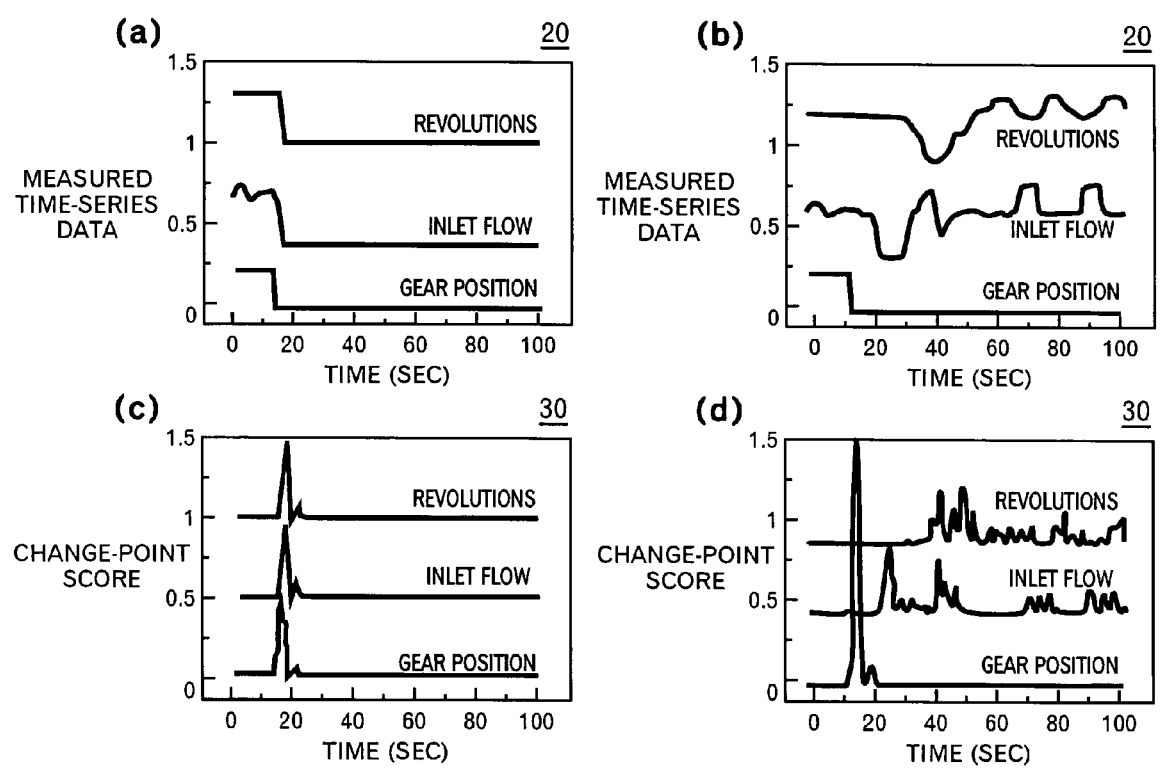
FIG. 11 shows the change-point score data 30 in the first application example in comparison to normal circumstances.

FIG. 11 shows the change-point score data 30 in the first application example in comparison to the normal circumstances. Regarding the automobile to be diagnosed, the change-point score calculating portion 100 calculates the time-series change-point score with which each of the plurality of parameters changes according to the passage of time based on the time-series data on the parameter. For instance, (b) shows the measured time-series data, and (d) shows the calculated change-point score. The change in the revolutions and the inlet flow delay against the change in the gear position. To be more specific, although the change-point scores of the revolutions and the inlet flow are almost the same, the change-point scores of the revolutions and the gear position are different and the change-point scores of the inlet flow and the gear position are also different.

Regarding the automobile in normal operation, the change-point score calculating portion 100 calculates the time-series change-point score with which each of the plurality of parameters changes according to the passage of time based on the time-series data on the parameter. For instance, in FIG. 11, (a) shows the change-point correlation measured under the normal circumstances, and (c) shows the change-point scores calculated based on the time-series data under the normal circumstances. If the gear position changes, the revolutions and the inlet flow immediately change. To be more specific, the changes in the revolutions, the inlet flow and the gear position are mutually strongly associated.

Figure 12:
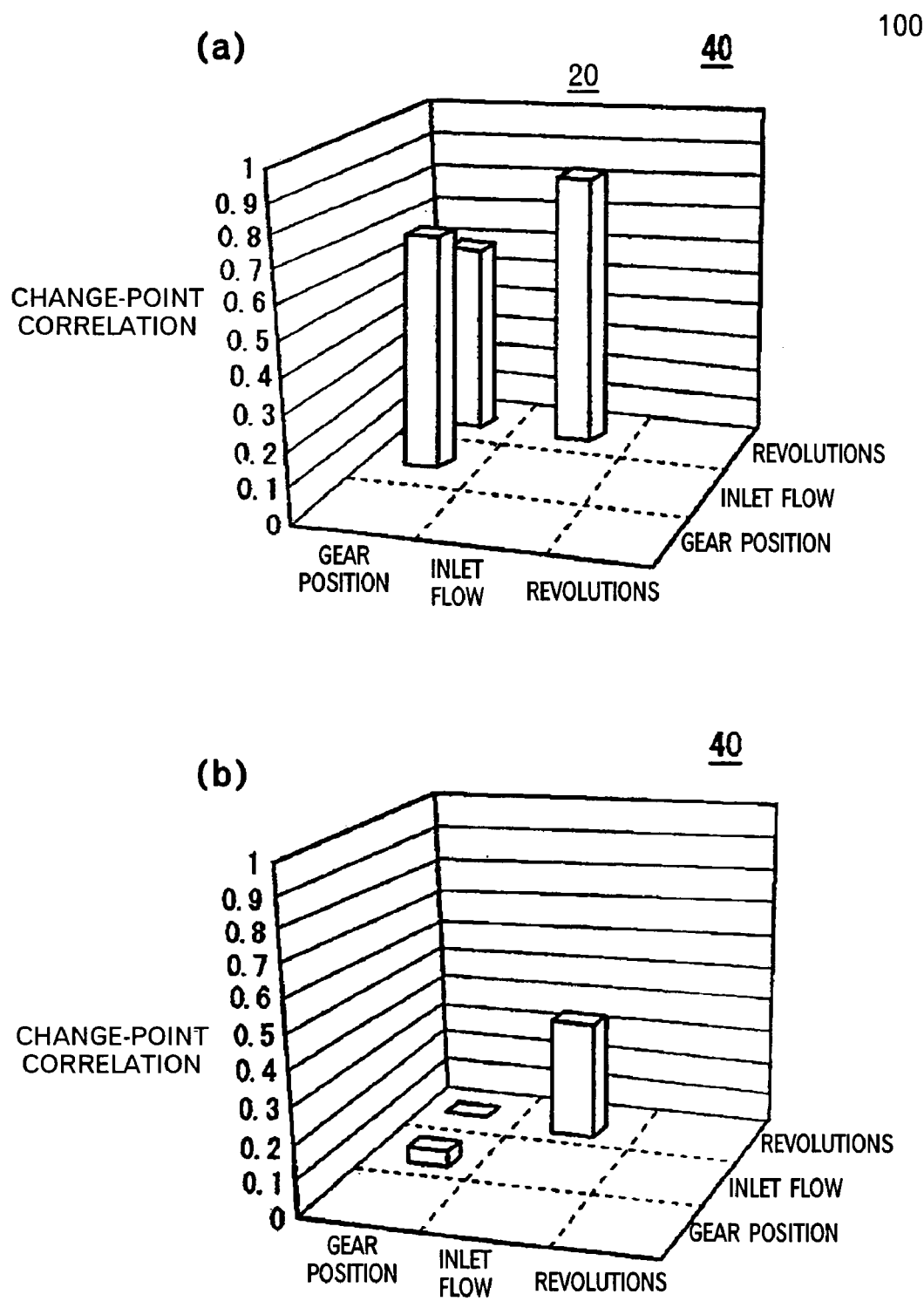
FIG. 12 shows the change-point correlation data 40 in the first application example in comparison to the normal circumstances.
Figure 13:
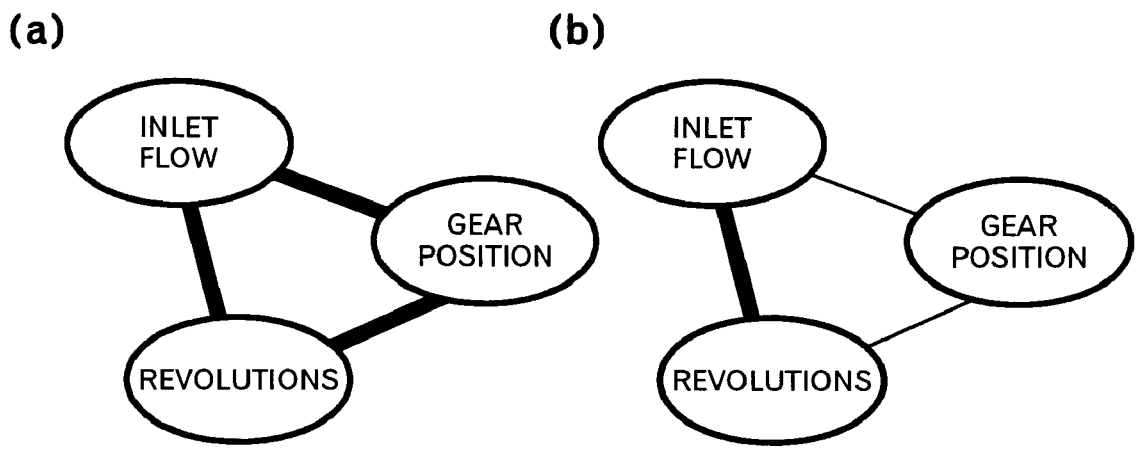
FIG. 13 shows the change-point correlation data 40 in the first application example in comparison to the normal circumstances.

FIGS. 12 and 13 show the change-point correlation data 40 in the first application example in comparison to the normal circumstances. (a) shows the change-point correlation under the normal circumstances, and (b) shows the change-point correlation in this application example. In this example, the degrees of association of the revolutions, the inlet flow and the gear position significantly exceed the reference change-point correlation (0.3) under the normal circumstances. On occurrence of the trouble, the change-point correlation of the revolutions and the inlet flow exceeds the reference change-point correlation, while the reference degree of the revolutions and the gear position and that of the inlet flow and the gear position are lower than the reference change-point correlation.

The measured object-related information outputting portion 130 generates and outputs the information indicating the association between the automobile under the normal circumstances and the automobile to be diagnosed based on the graphs of the degrees of association shown in FIG. 13 by the following procedure for instance.

Step 1

The measured object-related information outputting portion 130 generates the graphs of the degrees of association shown in FIG. 13 as to the first measured object (automobile under the normal circumstances for instance) and the second measured object (automobile to be diagnosed for instance). To be more specific, the measured object-related information outputting portion 130 generates the vertices indicating the parameters and the edges indicating the degrees of association among the parameters. And the measured object-related information outputting portion 130 generates a weight for indicating the value of the change-point correlation on each edge.

Step 2

It determines a variable s (j) correspondingly to each vertex j, and initializes the value to 0.

Step 3

It compares the two graphs of the degrees of association, and performs the process of the following steps 3-1 and 3-2 as to the edges adjacent to the vertices j.

Step 3-1

If the edges are only on one of the graphs, it adds the weights of the edges to S (j).

Step 3-2

If the edges are on both the graphs, it adds the weights of the edges to S (j).

Step 4

Of all the vertices, it selects those of which s (j) is a predetermined threshold or higher.

By this process, the measured object-related information outputting portion 130 compares each change-point correlation of the first measured object (automobile under the normal circumstances for instance) to the corresponding change-point correlation of the second measured object (automobile to be diagnosed for instance) so as to output the set of parameters of which value of difference in the change-point correlation exceeds the predetermined reference as the information indicating the association between the measured objects.

To be more specific, in this case, the measured object-related information outputting portion 130 may also produce an output to the effect that the portion provided with the sensor having measured the parameters of which difference exceeds the reference is a location of occurrence of the trouble of the automobile. It can thereby notify that the values of the change-point correlation of the inlet flow and the gear position and that of the revolutions and the gear position are abnormal compared to the normal circumstances.

Instead of this process, the measured object-related information outputting portion 130 may also compare the matrixes indicating the change-point correlation of each of the first and second measured objects so as to output the information based on the value of the difference between the corresponding degrees of association.

As shown in FIG. 13, the parameter outputting portion 120 may also output to the user the graph which indicates the parameters as the vertices, indicates the degrees of association exceeding the reference change-point correlation as the edges in a heavy line and indicates the degrees of association below the reference change-point correlation as the edges in a thin line.

The trouble to be diagnosed by the diagnostic apparatus 10 is not limited to the operation of the automobile itself such as the beat to the revolutions but may be the one based on the user's senses such as an uncomfortable ride quality thereof. Even in such cases, the diagnostic apparatus 10 can efficiently detect and output the parameter which may be the cause by comparing the change-point correlation among a large number of automobiles of the same type.

As a further example, the diagnostic apparatus 10 stores the time-series data in a certain automobile, and periodically (at every 100 km of travel distance for instance) receives the stored time-series data from the automobile. And the diagnostic apparatus 10 calculates the change-point correlation each time it receives the time-series data, and creates the graph indicating the change-point correlation. And if the variation in the change-point correlation exceeds a certain threshold, the diagnostic apparatus 10 determines that the automobile has some trouble and warns the user to make preventive repairs. Thus, in addition to seeking the cause of the trouble, it may also be used to prevent the trouble.

For instance, the diagnostic apparatus 10 calculates a sum of squares of a deviation of the change-point correlation as the variation of the change-point correlation. By way of example, a variation c is calculated by Formula 14.

[Formula 14]

$$c = \sqrt{\sum_{e(x,y)} [d_p(x, y) - \overline{d_p(x, y)}]^2} \quad (14)$$

Here, e (x, y) is the edge showing the change-point correlation of parameters x and y in the graph showing the degrees of association. And d (x, y) is the value of the change-point correlation. And the average of the degrees of association in the past is represented as Formula 15.

[Formula 15]

$$\overline{d_p(x,y)} \quad (15)$$

The diagnostic apparatus 10 may calculate the average of the degrees of association in the past based on a predetermined rate of oblivion α (Formula 16).

[Formula 16]

$$\overline{d_p(x,y)}^{(t)} = \alpha d_p(x,y)^{(t-1)} + (1-\alpha)\overline{d_p(x,y)}^{(t-1)} \quad (16)$$

Here, superscript (t) and (t−1) indicate that they are the degrees of association based on the time-series data received as t-th and t−1-th respectively. It is clarified, by comparing the result of Formula 16 to the following identity 17, that 1/α is a guide for the number of data points to be considered as to this average.

[Formula 17]

$$\frac{1}{t}\sum_{i=1}^{t} u(i) = \frac{1}{t}u(t) + \left(1 - \frac{1}{t}\right)\frac{1}{t-1}\sum_{i=1}^{t-1} u(i) \quad (17)$$

It is because, if it is t=1/α in Formula 16, an ordinary definition of the average satisfies Formula 16. It is possible, by considering this, to properly determine α from component life and so on. Furthermore, instead of it, the diagnostic apparatus 10 can use the average of the degrees of association predetermined about the automobile, such as the average of the degrees of association of the automobile from its initial state to traveling 2,000 km for instance.

APPLICATION EXAMPLE 2

Subsequently, a second application example will be described by using FIGS. 14 and 15. The second application example shows a detailed example of the process of having the parameters classified by the parameter outputting portion 120 by using the distance between the parameters calculated by the change-point correlation calculating portion 110.

Figure 14:
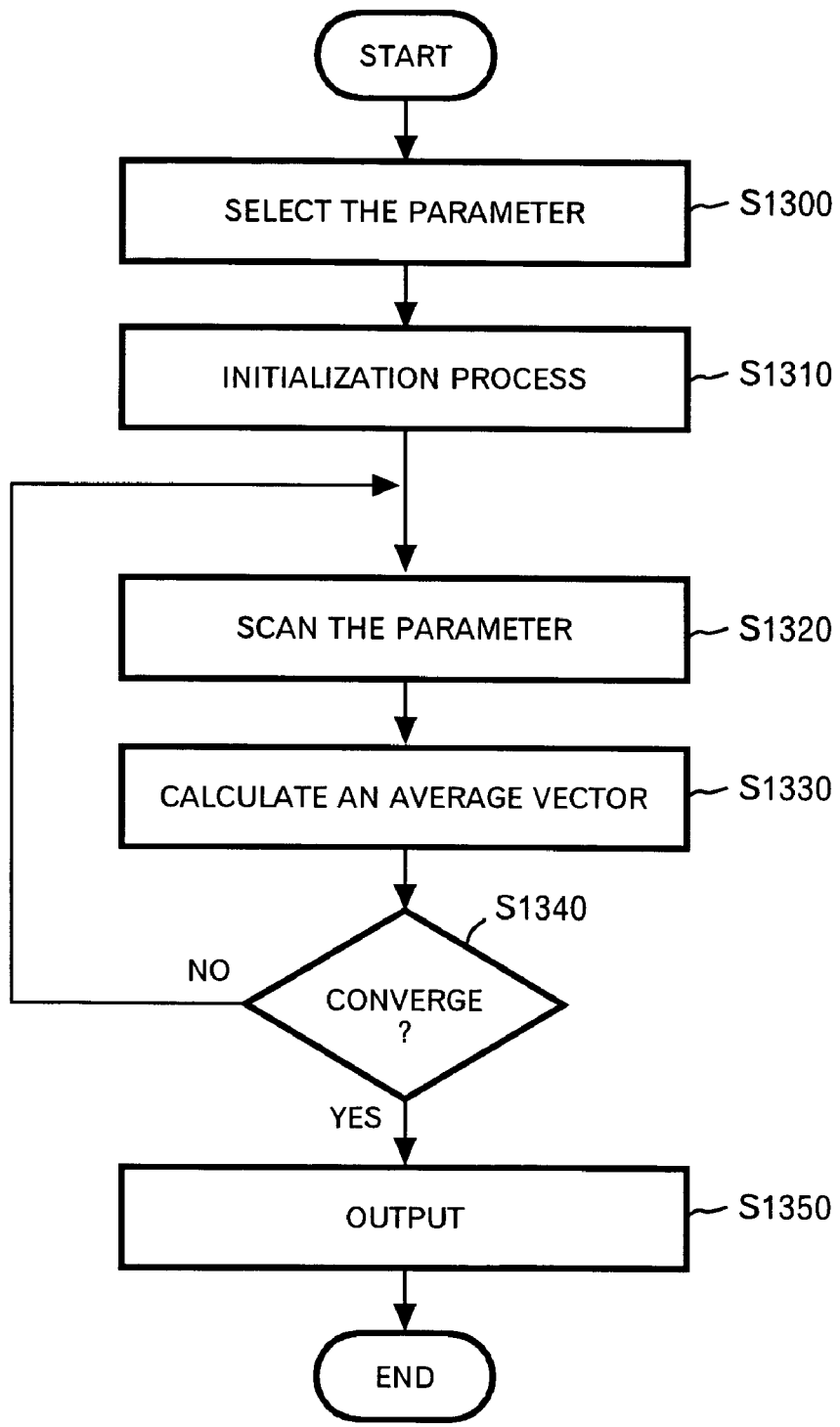
FIG. 14 shows an example of an operation flow of the process of a parameter outputting portion 120 in a second application example.

FIG. 14 shows an example of an operation flow of the process of the parameter outputting portion 120 in the second application example. In this example, the parameter outputting portion 120 uses K-means for grouping the vertices from the graph on which the distance between the vertices is determined. First, the parameter outputting portion 120 selects the parameter to be a seed of a group for each group based on the instruction from the user (S1300). And the parameter outputting portion 120 seeks the distances of all the parameters belonging to each group from a certain reference parameter so as to calculate the average thereof (S1310). To be more specific, at this stage, the distance of the parameter to be the seed itself is the average.

Subsequently, the parameter outputting portion 120 causes each parameter of the measured object to belong to the group having the average closest to the distance between the parameter and the reference parameter (S1320). The parameter outputting portion 120 further calculates the average in the group to which the parameter newly belongs (S1330). And if the difference between the average calculated last time and the average calculated this time do not converge in the predetermined range (S1340: NO), the parameter outputting portion 120 returns the process to S1320.

In the case where the averages converge (S1340: YES), the parameter outputting portion 120 outputs the grouped results (S1350).

Figure 15:
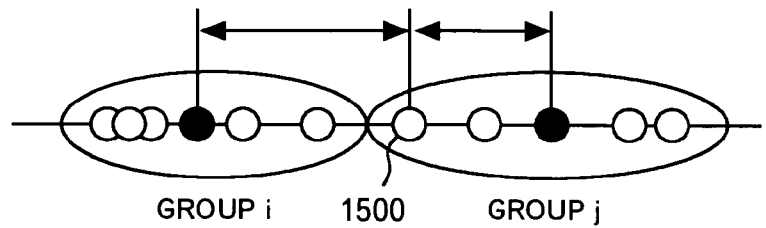
FIG. 15 is a diagram for describing an overview of the process of the parameter outputting portion 120 in the second application example.

FIG. 15 is a diagram for describing an overview of the process of the parameter outputting portion 120 in the second application example. As the distance between a parameter 1500 and the reference parameter is closer to the average of a group j than the average of a group i, the parameter outputting portion 120 causes the parameter 1500 to belong to the group j. Thus, the parameter outputting portion 120 can calculate the distance based on the change-point correlation so as to properly classify the parameters by an existing efficient method.

APPLICATION EXAMPLE 3

Subsequently, a third application example will be described by using FIGS. 16 and 17. The third application example shows another example of the process of having the parameters classified by the measured object-related information outputting portion 130 by using the distance between the parameters calculated by the change-point correlation calculating portion 110.

Figure 16:
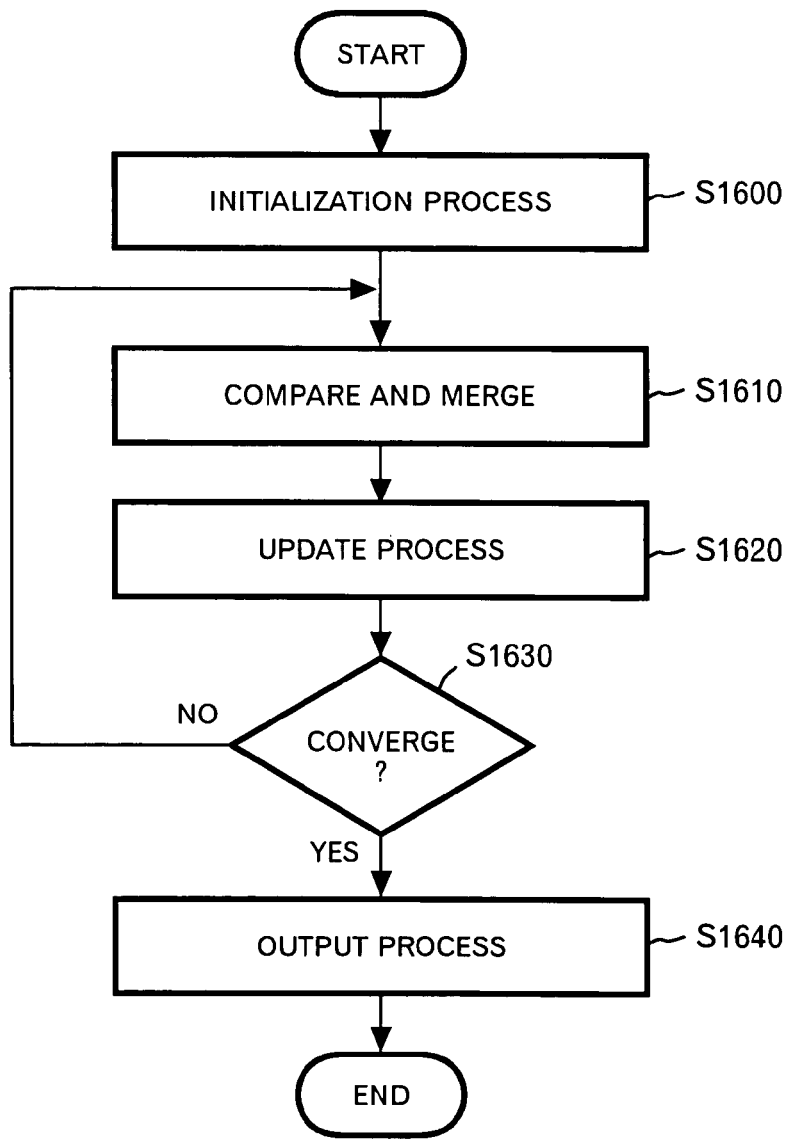
FIG. 16 shows an example of the operation flow of the process of the parameter outputting portion 120 in a third application example.

FIG. 16 shows an example of the operation flow of the process of the parameter outputting portion 120 in the third application example. As an initialization process, the parameter outputting portion 120 generates the group to which only that parameter belongs as to each parameter (S1600). And the parameter outputting portion 120 detects a set of groups of the shortest distance and merges these groups so as to cause the parameters belonging to these groups to belong to a new group (S1610).

The parameter outputting portion 120 calculates the distances between the newly merged group and the other groups (S1620). And if the number of groups converges to one (S1630), the parameter outputting portion 120 outputs the results of the grouping (S1640).

Figure 17:
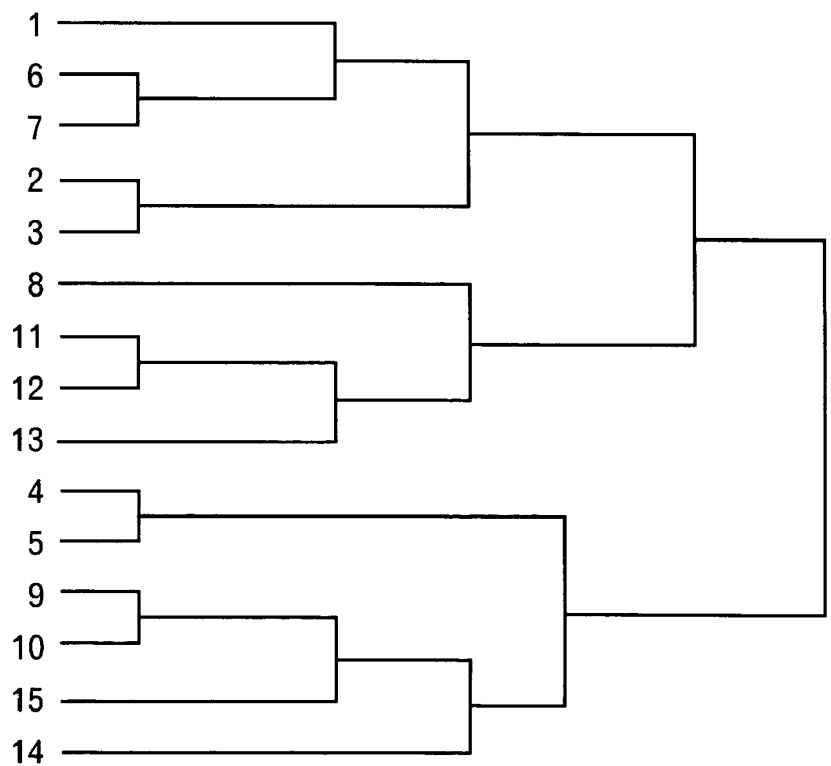
FIG. 17 shows a processing result of the parameter outputting portion 120 in the third application example.

FIG. 17 shows a processing result of the parameter outputting portion 120 in the third application example. Thus, the parameter outputting portion 120 can output the results of the grouping as a dendrogram. Consequently, the parameter outputting portion 120 outputs only the groups of which distances among them are less than the reference, for instance, as the groups of which parameters are mutually associated. In addition, the parameter outputting portion 120 may periodically generate this dendrogram. And in the case where this dendrogram changes according to the passage of time, the measured object-related information outputting portion 130 may determine that some trouble has occurred and produce an output to that effect.

APPLICATION EXAMPLE 4

Furthermore, a fourth application example will be described by using FIGS. 18 to 20. An object of the fourth application example is to detect economic news highly associated with stock price fluctuation based on the frequency with which the stock prices and economic news were reported in the past. The block diagram of a detector 60 in this application example is approximately the same as that of the diagnostic apparatus 10 shown in FIG. 1, and so a description thereof will be omitted. The stock price is an example of the prices of securities according to the present invention. Instead, the prices of the securities may be the prices of bonds, investment trusts, annuity trust, exchanges, securitized real estate or future goods, future deliveries or derivatives such as options.

Figure 18:
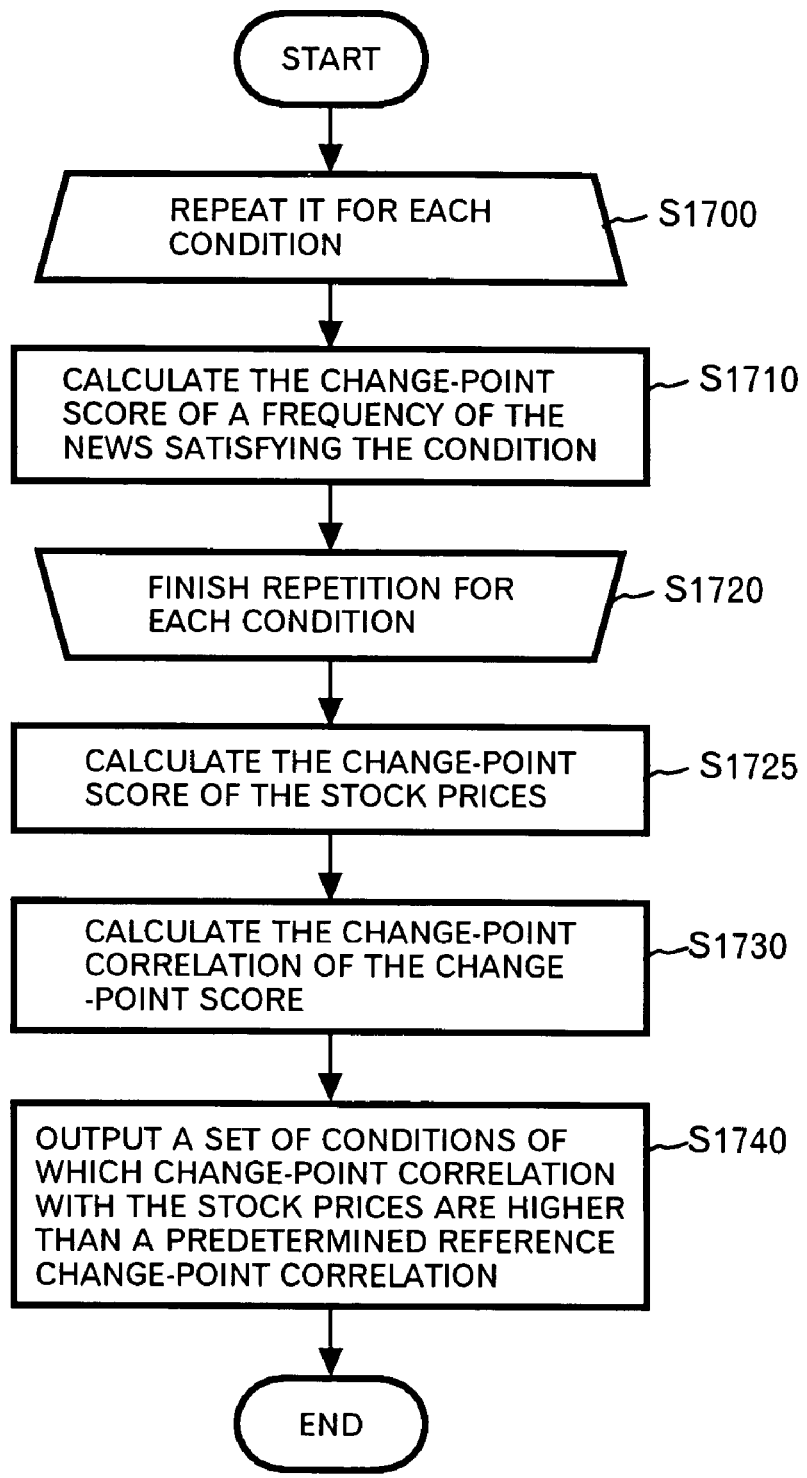
FIG. 18 shows an example of the operation flow of the process of the detector 60 in a fourth application example.

FIG. 18 shows an example of the operation flow of the process of the detector 60 in the fourth application example. The detector 60 repeats the following process as to each of a plurality of predetermined conditions which should be satisfied by the contents of the economic news (S1700). The change-point score calculating portion 100 of the detector 60 calculates the time-series change-point score of the frequency with which the economic news satisfying the conditions has been reported based on the time-series data indicating the frequency with which the economic news satisfying the conditions has been reported (S1710). The change-point score calculating portion 100 repeats the process as to each of the conditions (S1720).

Subsequently, the change-point score calculating portion 100 calculates the time-series change-point score with which the stock prices in the past changed according to the passage of time based on the time-series data indicating the fluctuation of the stock prices (S1725). The change-point correlation calculating portion 110 calculates the change-point correlation indicating the strength by which the change-point score of the stock prices is associated with the change-point score of the frequency with which the economic news satisfying each of the plurality of conditions has been reported (S1730). Of the plurality of predetermined conditions, the parameter outputting portion 120 outputs the set of the conditions of which degrees of association with the stock prices are higher than the predetermined reference change-point correlation (S1740).

Figure 19:
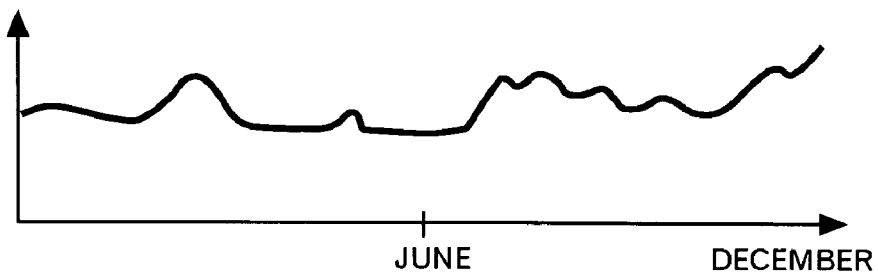
FIG. 19 shows an example of the time-series data 20 in the fourth application example.
Figure 19:
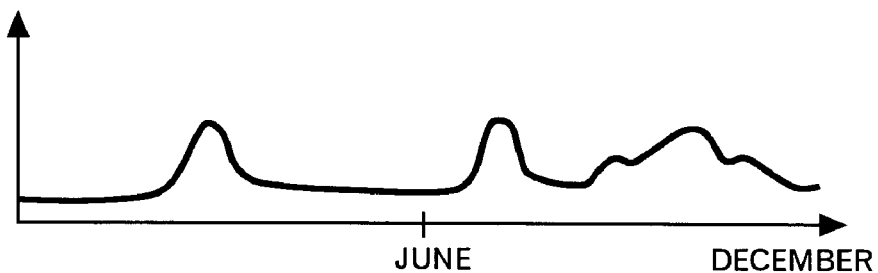
Figure 19:
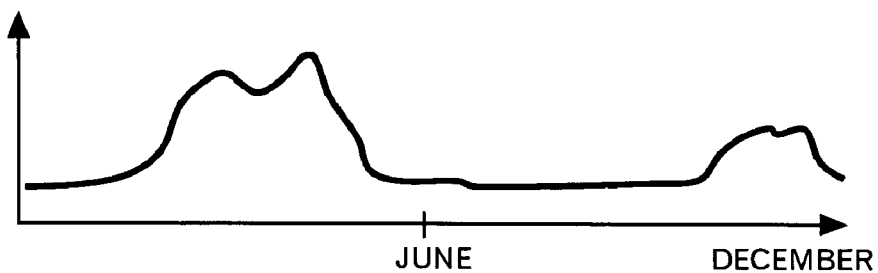
Figure 19:
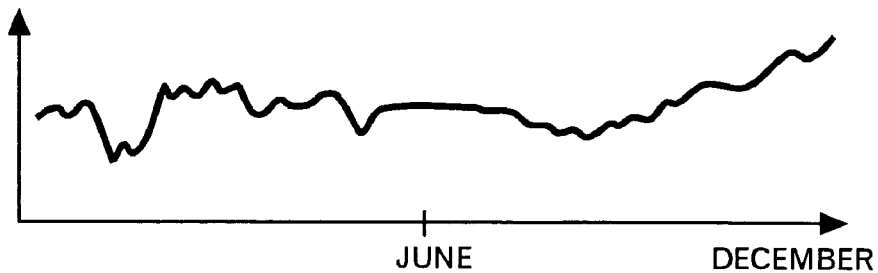

FIG. 19 shows an example of the time-series data 20 in the fourth application example. In each of (A) to (D), the horizontal axis shows the passage of time, and the vertical axis shows the size of each parameter. The change-point score calculating portion 100 inputs as the time-series data 20 the time-series data on the frequency, measured from an economic news report medium of the measured object, with which the economic news satisfying each of the conditions was reported in the same predetermined measurement period.

To be more precise, the change-point score calculating portion 100 inputs the time-series data on the frequency with which a remark of the president of a country A was reported as the economic news from the report medium, the time-series data on the frequency with which the information on an unemployment rate of the country A was reported as the economic news from the report medium, and the time-series data on the frequency with which a remark of a financier of a country B was reported as the economic news from the report medium. Furthermore, the change-point score calculating portion 100 inputs the time-series data showing the fluctuation of the stock prices in the country A.

Here, the economic news is the news reported as the news in an economic field from a predetermined report medium. And the report medium is a newspaper, a TV program, a magazine or a Web site for instance. By way of example, the economic news in this example is the news carried on an economic page of a newspaper of a predetermined newspaper publisher. The frequency with which the economic news satisfying the predetermined conditions is reported is the number of times the news satisfying the conditions is carried during the predetermined measurement period such as one month for instance.

Figure 20:
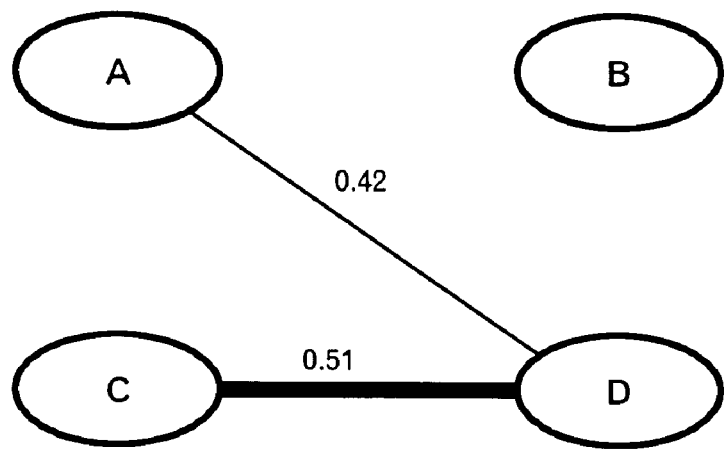
FIG. 20 shows examples of the change-point correlation data 40 and the classification result 50 in the fourth application example.

FIG. 20 shows an example of the classification result 50 in the fourth application example. (a) shows the classification result 50 represented as the graph showing the change-point correlation. (b) shows the classification result 50 represented as a table indicating the conditions having the degrees of association higher than a predetermined reference change-point correlation. The change-point correlation calculating portion 110 calculates the change-point correlation between the frequency with which a remark of the president of the country A is reported (A) and the fluctuation of the stock prices in the country A (D) at 0.42. The change-point correlation calculating portion 110 also calculates the change-point correlation between the frequency with which the remark of the financier of the country B is reported (C) and the fluctuation of the stock prices in the country A (D) at 0.51.

Thus, the parameter outputting portion 120 outputs the set of conditions of the economic news of which degrees of association are higher than the reference change-point correlation (0.3 for instance).

As shown in the fourth application example as above, the detector 60 can detect the set of conditions of the economic news which influence the fluctuation of the stock prices. Thus, the user can analyze the fluctuation of the stock prices in the past so as to facilitate a forecast of the stock prices in future.

Figure 21:
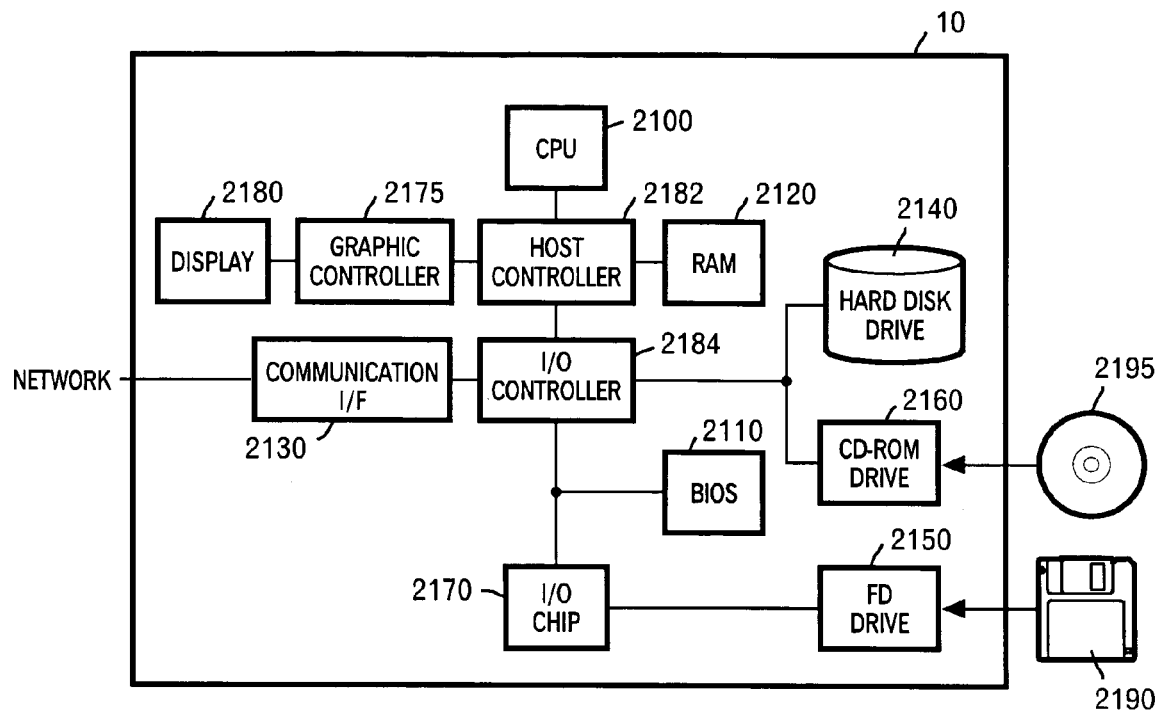
FIG. 21 shows an example of a hardware configuration of a computer which functions as the diagnostic apparatus 10.

FIG. 21 shows an example of a hardware configuration of a computer which functions as the diagnostic apparatus 10. The diagnostic apparatus 10 comprises a CPU periphery having a CPU 2100 interconnected by a host controller 2182, an RAM 2120, a graphic controller 2175 and a display 2180, an input-output portion having a communication interface 2130 connected to the host controller 2182 by an input-output controller 2184, a hard disk drive 2140 and a CD-ROM drive 2160, and a legacy input-output portion having a BIOS 2110 connected to the input-output controller 2184, a flexible disk drive 2150 and an input-output chip 2170.

The host controller 2182 connects the RAM 2120 to the CPU 2100 for accessing the RAM 2120 at a high transfer rate and the graphic controller 2175. The CPU 2100 operates based on the programs stored in the BIOS 2110 and the RAM 2120 so as to control each portion. The graphic controller 2175 obtains image data generated on a frame buffer provided in the RAM 2120 by the CPU 2100 and so on, and has it displayed on the display 2180. Instead, the graphic controller 2175 may include inside it the frame buffer for storing the image data generated by the CPU 2100 and so on.

The input-output controller 2184 connects the host controller 2182 to the communication interface 2130 which is a relatively high-speed input-output device, the hard disk drive 2140 and the CD-ROM drive 2160. The communication interface 2130 communicates with an external apparatus via a network. The communication interface 2130 also communicates with a semiconductor testing device 10. The hard disk drive 2140 stores the program and the data used by the diagnostic apparatus 10. The CD-ROM drive 2160 reads the program or the data from a CD-ROM 2195, and provides it to the input-output chip 2170 via the RAM 2120.

The input-output controller 2184 is connected to the BIOS 2110 and relatively low-speed input-output devices such as the flexible disk drive 2150 and the input-output chip 2170. The BIOS 2110 stores a boot program executed by the CPU 2100 on starting the diagnostic apparatus 10, the programs dependent on hardware of the diagnostic apparatus 10 and so on. The flexible disk drive 2150 reads the program or the data from a flexible disk 2190, and provides it to the input-output chip 2170 via the RAM 2120. The input-output chip 2170 connects the flexible disk 2190 and various input-output devices via a parallel port, a serial port, a keyboard port, a mouse port and so on for instance.

The programs provided to the diagnostic apparatus 10 are stored in a recording medium such as the flexible disk 2190, the CD-ROM 2195 or an IC card to be provided by the user. The programs are read from the recording medium via the input-output chip 2170 and/or the input-output controller 2184 to be installed and executed on the diagnostic apparatus 10.

The programs installed and executed on the diagnostic apparatus 10 include a change-point score calculating module, a change-point correlation calculating module, a parameter outputting module and a measured object-related information outputting module. The operation which each module promotes the diagnostic apparatus 10 to perform is the same as that of a corresponding member in the diagnostic apparatus 10 described in FIGS. 1 to 20, and so a description thereof will be omitted.

The programs shown above may be stored on an external storage medium. As for the storage medium, an optical recording medium such as a DVD or a PD, a magnet-optical recording medium such as an MD, a tape medium or a semiconductor memory such as the IC card may be used other than the flexible disk 2190 and the CD-ROM 2195. It is also possible to use as the recording medium a storage device such as a hard disk or the RAM provided on a server system connected to a private communication network or the Internet so as to provide the programs to the diagnostic apparatus 10 via the network.

The computer for functioning as the detector 60 described in the fourth application example takes approximately the same hardware configuration as the computer described in FIG. 21, and so a description thereof will be omitted.

As described above, according to this embodiment, the diagnostic apparatus 10 or the detector 60 can diagnose the measured object based on the time-series data on the plurality of parameters measured from the measured object which is an information system or a mechanical system. To be more precise, the diagnostic apparatus 10 or the detector 60 outputs the set of parameters of high degrees of association or the set of parameters of the degrees of association different from those calculated last time so as to properly notify the user of a location at which the trouble occurred in the measured object or the parameter which may become the cause. Thus, it is possible to facilitate the analysis and prevention of the trouble and also support the work for repairing the automobile and so on as the measured objects.

Figure 22:
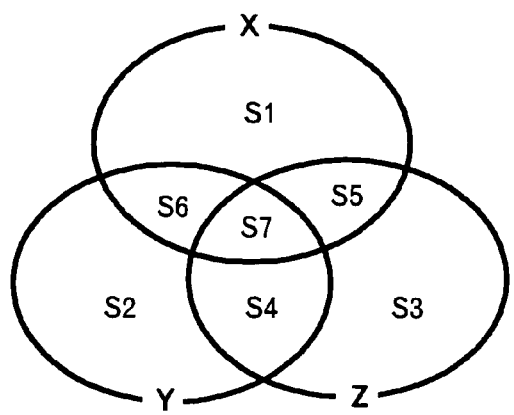
FIG. 22 is a diagram for demonstrating that a distance is calculated by a change-point correlation calculating portion 110.

FIG. 22 is a diagram for demonstrating that the distance is calculated by the change-point correlation calculating portion 110. It is demonstrated, by using FIG. 22, that the distance calculated by the change-point correlation calculating portion 110 (Formula 13) satisfies the condition as the distance. First, the condition to be satisfied by the distance is represented as Formula 18.

[Formula 18]

$$d_p(x,y) + d_p(y,z) \geq d_p(x,z) \quad (18)$$

As for the change-point scores calculated and normalized as to parameters x, y and z by the change-point score calculating portion 100, the graph indicating the change-point scores and the regions surrounded by time bases are X, Y and Z. As the change-point scores are normalized, S (X), S (Y) and S (Z) which are the areas of X, Y and Z satisfy the following Formula.

[Formula 19]

$$S(X) = S(Y) = S(Z) = 1 \quad (19)$$

Formula 20 is satisfied by a definition of the change-point correlation.

[Formula 20]

$$d_p(x,y) = 1 - p(x,y) = 1 - S(X \cap Y)$$

$$d_p(y,z) = 1 - p(y,z) = 1 - S(Y \cap Z)$$

$$d_p(x,z) = 1 - p(x,z) = 1 - S(X \cap Z) \quad (20)$$

Here, as shown in FIG. 22, it is defined that the region included only in the region X is $S_1$, the region included only in the region Y is $S_2$, and the region included only in the region Z is $S_3$. Furthermore, it is defined that the regions included in both the regions Y and Z are $S_4$ and $S_7$, and the region further included in the region Y thereof is $S_7$, the regions included in both the regions X and Y are $S_6$ and $S_7$, and the regions included in both the regions X and Z are $S_5$ and $S_7$. By this definition, (left side—right side) of Formula 18 is deformed as Formula 21. As above, it is demonstrated that the distance calculated by the change-point correlation calculating portion 110 satisfies the condition as the distance.

[Formula 21]

$$\begin{aligned}
\text{(left side)} - \text{(right side)} &= 1 - S(X \cap Y) + 1 - S(Y \cap Z) - \\
&\quad 1 + S(X \cap Z) \\
&= 1 - S_6 - S_7 + 1 - S_4 - S_7 - 1 + S_5 + S_7 \\
&= (1 - S_4 - S_6 - S_7) + S_5 \\
&= S_2 + S_5 \geq 0
\end{aligned} \quad (21)$$

The present invention was described above by using the embodiment. However, technical scope of the present invention is not limited to the scope described in the embodiment. It is possible, as will be understood by the skilled person, to make various changes or improvements to the embodiment. It is understood, according to the Claims, that the forms to which such changes or improvements are made may also be included in the technical scope of the present invention.

According to the embodiment described above, the diagnostic apparatus, detector, control method, detection method, program and recording medium shown in the following items are implemented.

(Item 1) A diagnostic apparatus for diagnosing the measured object based on time-series data on the plurality of parameters measured from the measured object, the apparatus comprising: the change-point score calculating portion for calculating the time-series change-point score with which each of the plurality of parameters changes according to the passage of time based on the time-series data on the parameter; the change-point correlation calculating portion for calculating the change-point correlation indicating the strength by which each of the plurality of parameters is associated with each of the other parameters based on the change-point scores of the parameter and the other parameter; and the parameter outputting portion for outputting the set of parameters of which calculated degrees of associations are higher than the predetermined reference change-point correlation as the set of mutually strongly associated parameters.

(Item 2) The diagnostic apparatus according to the item 1, wherein, in the case where the parameter having caused the trouble is specified by the user, the parameter outputting portion outputs the set of parameters of which degrees of association with the specified parameter are higher than the reference change-point correlation.

(Item 3) The diagnostic apparatus according to the item 1, wherein: the change-point score calculating portion calculates the time-series change-point score with which each of the plurality of parameters having mutually different units changes according to the passage of time; and the change-point correlation calculating portion normalizes the change-point score of each parameter so that an integral of the change-point score of the parameter becomes the predetermined unit quantity in the predetermined measurement period so as to calculate the change-point correlation based on the normalized change-point score.

(Item 4) The diagnostic apparatus according to the item 1, wherein, as the change-point correlation for indicating the strength by which each of the plurality of parameters is associated with each of the other parameters, the change-point correlation calculating portion uses as the comparison objects the change-point score of the parameter and the change-point score of the other parameter having delayed by the predetermined delay time against the parameter so as to calculate the maximum value of the change-point correlation based on comparisons made by sequentially changing the delay time in the predetermined range.

(Item 5) The diagnostic apparatus according to the item 4, wherein, the change-point correlation calculating portion further calculates the delay time in the case of having calculated the maximum value of the change-point correlation; and of the parameters of which degrees of association with the parameter specified by the user are higher than the reference change-point correlation, the parameter outputting portion outputs the parameter of which change-point correlation becomes higher than the reference change-point correlation by delaying it against the parameter specified by the user.

(Item 6) The diagnostic apparatus according to the item 1, wherein, in the case where, as the change-point score of each time in the predetermined measurement period, the transition pattern of the time-series data at the time is different from that measured in the predetermined range of time from the time in the past, the change-point score calculating portion calculates a higher value in comparison to the case where it is the same as the transition pattern of the time-series data observed in the range of time.

(Item 7) The diagnostic apparatus according to the item 6, wherein the change-point score calculating portion calculates the change-point score by applying a specific spectrum analysis method to the time-series data.

(Item 8) The diagnostic apparatus according to the item 1, wherein, as to a distance of each of the plurality of parameters and each of the other parameters, in the case where the change-point correlation of the parameter and the other parameter is higher, the parameter outputting portion calculates a smaller value in comparison to the case where it is lower, and classifies the plurality of parameters into groups including the mutually strongly associated parameters based on the calculated distance so as to output the classification result.

(Item 9) The diagnostic apparatus according to the item 1, wherein: the measured object is the automobile; and the change-point score calculating portion calculates the change-point scores of the plurality of parameters indicating the measured values of the plurality of sensors based on the plurality of time-series data measured by the plurality of sensors provided to each portion of the automobile; and in the case where the predetermined parameter becomes the value outside the reference range due to the occurrence of trouble to the automobile, the parameter outputting portion outputs the set of the parameters of which degrees of association with the parameter are higher than the reference change-point correlation as the information indicating the cause of the trouble.

(Item 10) The diagnostic apparatus for diagnosing a measured object based on time-series data on the plurality of parameters measured from the measured object, the apparatus comprising: the change-point score calculating portion for, as to each of the plurality of the measured objects having mutually corresponding parameters, calculating the time-series change-point score with which each of the plurality of parameters of the measured object changes according to the passage of time based on the time-series data on the parameter; the change-point correlation calculating portion for, as to each of the plurality of measured objects, calculating the change-point correlation indicating the strength by which each of the plurality of parameters of the measured object is associated with each of the other parameters based on the change-point scores of the parameter and the other parameter; and the measured object-related information outputting portion for, based on each change-point correlation of a first measured object and the change-point correlation of a second measured object corresponding thereto, outputting the information indicating the association between the first measured object and the second measured object.

(Item 11) The diagnostic apparatus according to the item 10, wherein the measured object-related information outputting portion outputs the set of parameters of which value of difference between each change-point correlation of the first measured object and the change-point correlation of the second measured object corresponding thereto exceeds the predetermined reference as the information indicating the association between the first measured object and the second measured object.

(Item 12) The diagnostic apparatus according to the item 10, wherein: as the change-point correlation for indicating the strength by which each of the plurality of parameters is associated with each of the other parameters, the change-point correlation calculating portion uses as comparison objects the change-point score of the parameter and the change-point score of the other parameter having delayed by a predetermined delay time against the parameter so as to calculate the maximum value of the change-point correlation based on the comparisons made by sequentially changing the delay time in the predetermined range; and the measured object-related information outputting portion outputs the information to the effect that the parameters for calculating the change-point correlation are different between the first measured object and the second measured object in the case where there is a difference exceeding the predetermined reference value between the delay time on calculating the predetermined change-point correlation of the first measured object and the delay time on calculating that of the second measured object corresponding thereto.

(Item 13) The diagnostic apparatus according to the item 10, wherein: the first measured object is the normally operating automobile, and the second measured object is the automobile to be diagnosed; and as to each of the first measured object and the second measured object, the change-point score calculating portion calculates the change-point scores of the plurality of parameters indicating measured values of the plurality of sensors based on the plurality of time-series data measured by the plurality of sensors provided to each portion of the measured object; and in the case where there is the difference exceeding the predetermined reference value between the change-point correlation of the first measured object and that of the second measured object corresponding thereto, the measured object-related information outputting portion produces an output to the effect that the portion having the sensor for measuring the parameters as calculation objects of the change-point correlation provided thereto is the location of occurrence of the trouble of the automobile which is the second measured object.

(Item 14) The detector for detecting the economic news highly associated with the price fluctuation of securities, the detector comprising: the change-point score calculating portion for calculating the time-series change-point score with which the prices of the securities in the past have changed according to the passage of time based on time-series data indicating the price fluctuation of the securities, and calculating the time-series change-point score of the frequency with which the economic news satisfying each of the plurality of conditions has been reported based on the time-series data indicating the frequency with which the economic news satisfying the condition has been reported; the change-point correlation calculating portion for calculating the change-point correlation indicating the strength by which the change-point score of the prices of the securities is associated with the change-point score of the frequency with which the economic news satisfying each of the plurality of conditions has been reported; and the parameter outputting portion for, of the plurality of conditions, outputting the set of the conditions of the economic news of which degrees of association with the change-point score of the prices of the securities are higher than the predetermined reference change-point correlation.

(Item 15) The control method for controlling the diagnostic apparatus for diagnosing the measured object based on the time-series data on the plurality of parameters measured from the measured object, the method comprising: a change-point score calculating step of calculating a time-series change-point score with which each of the plurality of parameters changes according to the passage of time based on the time-series data on the parameter; a change-point correlation calculating step of calculating the change-point correlation indicating the strength by which each of the plurality of parameters is associated with each of the other parameters based on the change-point scores of the parameter and the other parameter; and a parameter outputting step of outputting the set of parameters of which calculated degrees of association are higher than the predetermined reference change-point correlation as the set of mutually strongly associated parameters.

(Item 16) The control method for controlling the diagnostic apparatus for diagnosing the measured object based on the time-series data on the plurality of parameters measured from the measured object, the method comprising: the change-point score calculating step of, as to each of the plurality of measured objects having mutually corresponding parameters, calculating the time-series change-point score with which each of the plurality of parameters of the measured object changes according to the passage of time based on the time-series data on the parameter; the change-point correlation calculating step of, as to each of the plurality of the measured objects, calculating the change-point correlation indicating the strength by which each of the plurality of parameters of the measured object is associated with each of the other parameters based on the change-point scores of the parameter and the other parameter; and a measured object-related information outputting step of outputting the information indicating the association between the first measured object and the second measured object based on each change-point correlation of the first measured object and the change-point correlation of the second measured object corresponding thereto.

(Item 17) The detection method for detecting the economic news highly associated with the price fluctuation of securities with a computer. The method comprising by means of the computer: the change-point score calculating step of calculating the time-series change-point score with which the prices of the securities in the past have changed according to the passage of time based on the time-series data indicating the price fluctuation of the securities, and calculating the time-series change-point score of the frequency with which the economic news satisfying each of the plurality of conditions has been reported based on the time-series data indicating the frequency with which the economic news satisfying the condition has been reported; the change-point correlation calculating step of calculating the change-point correlation indicating the strength by which the change-point score of the prices of the securities is associated with the change-point score of the frequency with which the economic news satisfying each of the plurality of conditions has been reported; and the parameter outputting step of, of the plurality of conditions, outputting the set of the economic news of which degrees of association with the change-point score of the prices of the securities are higher than the predetermined reference change-point correlation.

(Item 18) The program for causing the computer to function as the diagnostic apparatus for diagnosing the measured object based on the time-series data on the plurality of parameters measured from the measured object, the program causing the computer to function as: the change-point score calculating portion for calculating the time-series change-point score with which each of the plurality of parameters changes according to the passage of time based on the time-series data on the parameter; the change-point correlation calculating portion for calculating the change-point correlation indicating the strength by which each of the plurality of parameters is associated with each of the other parameters based on the change-point scores of the parameter and the other parameter; and the parameter outputting portion for outputting the set of parameters of which calculated degrees of association are higher than the predetermined reference change-point correlation as the set of mutually strongly associated parameters.

(Item 19) The program for causing the computer to function as the diagnostic apparatus for diagnosing the measured object based on the time-series data on the plurality of parameters measured from the measured object, the program causing the computer to function as: the change-point score calculating portion for, as to each of the plurality of the measured objects having mutually corresponding parameters, calculating the time-series change-point score with which each of the plurality of parameters of the measured object changes according to the passage of time based on the time-series data on the parameter; the change-point correlation calculating portion for, as to each of the plurality of the measured objects, calculating the change-point correlation indicating the strength by which each of the plurality of parameters of the measured objects is associated with each of the other parameters based on the change-point scores of the parameter and the other parameter; and the measured object-related information outputting portion for outputting the information indicating the association between the first measured object and the second measured object based on each change-point correlation of the first measured object and the change-point correlation of the second measured object corresponding thereto.

(Item 20) The program for causing the computer to function as the detector for detecting the economic news highly associated with the price fluctuation of the securities, the program causing the computer to function as: the change-point score calculating portion for calculating the time-series change-point score with which prices of the securities in the past have changed according to the passage of time based on the time-series data indicating the price fluctuation of the securities, and calculating the time-series change-point score of the frequency with which the economic news satisfying each of the plurality of conditions has been reported based on the time-series data indicating the frequency with which the economic news satisfying the condition has been reported; the change-point correlation calculating portion for calculating the change-point correlation indicating the strength by which the change-point score of the prices of the securities is associated with the change-point score of the frequency with which the economic news satisfying each of the plurality of conditions has been reported; and the parameter outputting portion for, of the plurality of conditions, outputting the set of the conditions of the economic news of which degrees of association with the change-point score of the prices of the securities are higher than the predetermined reference change-point correlation.

(Item 21) The recording medium on which the program according to one of the items 18 to 20 is recorded.

What is claimed is:

1. A diagnostic apparatus comprising means for diagnosing a measured object based on time-series data of a plurality of parameters measured from the measured object, the means for diagnosing comprising:
a change-point score calculating portion for calculating a time-series change-point score with which each parameter of the plurality of parameters changes according to passage of time based on the time-series data on said each parameter;
a change-point correlation calculating portion for calculating a change-point correlation indicating strength by which each of the plurality of parameters is associated with each of other parameters based on the change-point scores of said each parameter and the other parameter; and
a parameter outputting portion for outputting a set of parameters of which calculated degrees of associations are higher than a predetermined reference change-point correlation said set being mutually strongly associated parameters.

2. The diagnostic apparatus according to claim 1, wherein when a particular parameter having caused trouble is specified by a user the parameter outputting portion outputs a set of parameters for which degrees of association with the particular parameter are higher than the reference change-point correlation.

3. The diagnostic apparatus according to claim 1, wherein: the change-point score calculating portion calculates the time-series change-point score with which each of the plurality of parameters having mutually different units changes according to the passage of time; and
the change-point correlation calculating portion normalizes the change-point score to form a normalized change-point score of each parameter, so that an integral of the change-point score of each parameter becomes a predetermined unit quantity in a predetermined measurement period so as to calculate the new change-point correlation based on the normalized change-point score.

4. The diagnostic apparatus according to claim 1, wherein as the change-point correlation for indicating the strength by which each of the plurality of parameters is associated with each of the other parameters the change-point correlation calculating portion uses as comparison objects the change-point score of the parameter and the change-point score of the other parameter being delayed by a predetermined delay time against the parameter so as to calculate a maximum value of the change-point correlation based on comparisons made by sequentially changing the delay time in a predetermined range.

5. The diagnostic apparatus according to claim 4, wherein,
the change-point correlation calculating portion further calculates the delay time in a case of having calculated the maximum value of the change-point correlation; and
of the parameters of which degrees of association with the parameter specified by the user are higher than the reference change-point correlation the parameter outputting portion outputs the parameter of which change-point correlation becomes higher than the reference change-point correlation by delaying it against the parameter Specified by the user.

6. The diagnostic apparatus according to claim 1, wherein, in a case wherein as the change-point score of each time in the predetermined measurement period, a transition pattern of the time-series data at the time is different frost that measured in the predetermined range of time from a tine in the past, the change-point score calculating portion calculates a higher value in comparison to the case wherein it is the same as the transition pattern of the time-series data observed in the range of time.

7. The diagnostic apparatus according to claim 6, wherein the change-point score calculating portion calculates the change-point score by applying a specific spectrum analysis method to the time-series data.

8. The diagnostic apparatus according to claim 1, wherein as to a distance between each parameter of the plurality of parameters and each of the other parameters, in a case where the change-point correlation of said each parameter and the other parameter is higher, the parameter outputting portion calculates a smaller value in comparison to the case where it is lower, and classifies the plurality of parameters into groups including the mutually strongly associated parameters based on the calculated distance so as to output a classification result.

9. The diagnostic apparatus according to claim 1, wherein:

the measured object is an automobile; and the change-point score calculating portion calculates the change-point scores of the plurality of parameters indicating measured values of a plurality of sensors based on a plurality of time-series data measured by the plurality of sensors provided to each portion of the automobile;

and in the case where a predetermined parameter becomes a value outside a reference range due to occurrence of trouble to the automobile, the parameter outputting portion outputs a set of the parameters of Which degrees of association with the parameter are higher than the reference change-point correlation as information indicating a cause of the trouble.

10. A diagnostic apparatus comprising means for diagnosing a measured object based on time-series data on a plurality of parameters measured from a measured object, the means for diagnosing comprising:

a change-point score calculating portion for, as to each of a plurality of the measured objects having mutually corresponding parameters calculating a time-series change-point score with which each of the plurality of parameters of the measured object changes according to passage of time based on the time-series data on the parameter;

a change-point correlation calculating portion for, as to each of the plurality of measured objects, calculating a change-point correlation indicating strength by which each of the plurality of parameters of the measured object is associated wit each of other parameters based on the change-point scores of the parameter and the other parameter and a measured object-related information outputting portion for, based on each change-point correlation of a first measured object and the change-point correlation of a second measured object corresponding thereto, outputting information indicating association between the first measured object and the second measured object.

11. The diagnostic apparatus according to claim 10, wherein the measured object-related information outputting portion outputs a set of parameters of which value of difference between each change-point correlation of the first measured object and the change-point correlation of the second measured object corresponding thereto exceeds a predetermined reference as the information indicating the association between the first measured object and the second measured object.

12. The diagnostic apparatus according to claim 10, wherein:

as the change-point correlation for indicating the strength by which each parameter of the plurality of parameters is associated with each of the other parameters, the change-point correlation calculating portion uses as comparison objects the change-point score of the parameter and the change-point score of the other parameter having delayed by a predetermined delay time against the parameter so as to calculate a maximum value of the change-point correlation based on comparisons made by sequentially changing the delay time in a predetermined range; and the measured object-related information outputting portion outputs the information to the effect that the parameters for calculating the change-point correlation are different between the first measured object and the second measured object in the case where there is a difference exceeding a predetermined reference value between the delay time on calculating the predetermined change-point correlation of the first measured object and the delay time on calculating that of the second measured object corresponding thereto.

13. The diagnostic apparatus according to claim 10, wherein:

the first measured object is a normally operating automobile, and the second measured object is an automobile to be diagnosed;

as to each of the first measured object and the second measured object, the change-point score calculating portion calculates the change-point scores of the plurality of parameters indicating measured values of a plurality of sensors based on the plurality of time-series data measured by the plurality of sensors provided to each portion of the measured object;

and in the case where there is the difference exceeding the predetermined reference value between the change-point correlation of the first measured object and that of the second measured object corresponding thereto, the measured object-related information outputting portion produces an output to the effect that the portion having the sensor for measuring the parameters as calculation objects of the change-point correlation provided thereto is a location of occurrence of the trouble of the automobile which is the second measured object.

14. A control method for controlling a diagnostic apparatus for diagnosing a measured object based on time-series data on a plurality of parameters measured from the measured object, the method comprising:

a change-point score calculating step of calculating a time-series change-point score with which each of the plurality of parameters changes according to passage of time based on the time-series data on the parameter;

a change-point correlation calculating step of calculating a change-point correlation indicating strength by which each of the plurality of parameters is associated with each of other parameters based on the change-point scores of the parameter and the other parameter; and a parameter outputting step of outputting a set of parameters of which calculated degrees of association are higher than a predetermined reference change-point correlation as a set of mutually strongly associated parameters.

15. A control method for controlling a diagnostic apparatus for diagnosing a measured object based on time-series data on a plurality of parameters measured from the measured object, the method comprising:

a change-point score calculating step of, as CO each of a plurality of the measured objects having mutually corresponding parameters, calculating a time-series change-point score with which each of the plurality of parameters of the measured object changes according to passage of time based on the time-series data on the parameter;

a change-point correlation calculating step of, as to each of the plurality of the measured objects, calculating a change-point correlation indicating strength by which each of the plurality of parameters of the measured object is associated with each of other parameters based on the change-point scores of the parameter and the other parameter;

and a measured object-related information outputting step of outputting information indicating association between a first measured object and a second measured object based on each change-point correlation of the first measured object and the change-point correlation of the second measured object corresponding thereto.

16. A program embodied in a tangible computer medium, said program for causing a computer to function as a diagnostic apparatus for diagnosing a measured object based on time-series data on a plurality of parameters measured from the measured object, the program causing the computer to function as: a change-point score calculating portion for calculating a time-series change-paint score with which each of the plurality of parameters changes according to passage of time based on the time-series data on the parameter;

a change-point correlation calculating portion for calculating a change-point correlation indicating strength by which each of the plurality of parameters is associated with each of the other parameters based on the change-point scores of the parameter and the other parameter; and a parameter outputting portion for outputting a set of parameters of which calculated degrees of association are higher than a predetermined reference change-point correlation as a set of mutually strongly associated parameters.

17. A recording medium on which the program according to claim 16 is recorded.

18. A program embodied in a tangible computer medium, said program for causing a computer to function as a diagnostic apparatus for diagnosing a measured object based on time-series data on a plurality of parameters measured from the measured object, the program causing the computer to function as:

a change-point score calculating portion for, as to each of a plurality of the measured objects having mutually corresponding parameters, calculating a time-series change-point score with which each of the plurality of parameters of the measured object changes according to passage of tine based on the time-series data on the parameter;

a change-point correlation calculating portion for, as to each of the plurality of the measured objects calculating a change-point correlation indicating strength by which each of the plurality of parameters of the measured abject is associated with each of other parameters based on the change-point scores of the parameter and the other parameter; and a measured object-related information outputting portion for outputting information indicating association between a first measured object and a second measured object based on each change-point correlation of the first measured object and the change-point correlation of the second measured object corresponding thereto.

* * * * *